US012233975B2

(12) United States Patent
Dubois et al.

(10) Patent No.: US 12,233,975 B2
(45) Date of Patent: Feb. 25, 2025

(54) TELESCOPIC BICYCLE SEATPOST WITH ADJUSTABLE HEIGHT AND FIXED FRAME INSERTION

(71) Applicant: The Hive Global, Inc., Taichung (TW)

(72) Inventors: George Dubois, San Luis Obispo, CA (US); Joel Peters, Taichung (TW)

(73) Assignee: The Hive Global Inc., Taichung (TW)

( * ) Notice: Subject to any disclaimer, the term of this patent is extended or adjusted under 35 U.S.C. 154(b) by 0 days.

(21) Appl. No.: 17/701,309

(22) Filed: Mar. 22, 2022

(65) Prior Publication Data

US 2022/0306229 A1   Sep. 29, 2022

Related U.S. Application Data

(60) Provisional application No. 63/166,792, filed on Mar. 26, 2021.

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
None
See application file for complete search history.

(56) References Cited

U.S. PATENT DOCUMENTS

| 512,729 A | 1/1894 | Lucas et al. |
|---|---|---|
| 527,384 A | 10/1894 | Davids |
| 527,520 A | 10/1894 | Copeland |
| 547,639 A | 10/1895 | Grubb |
| 575,712 A | 1/1897 | Hamilton |

(Continued)

FOREIGN PATENT DOCUMENTS

| DE | 102006015582 A1 | 10/2007 |
|---|---|---|
| DE | 202018103890 U1 | 11/2019 |

(Continued)

OTHER PUBLICATIONS

The Official Letter dated Apr. 5, 2023 from the European Patent Application No. EP18848212.9.

(Continued)

*Primary Examiner* — Steven M Marsh
(74) *Attorney, Agent, or Firm* — Haverstock & Owens, A Law Corporation

(57) ABSTRACT

A telescopic, height adjustable, bicycle seatpost with a fixed frame insertion length, but adjustable uncompressed resting height is described herein. This telescopic bicycle seatpost with adjustable height and fixed frame insertion provides a unique structure and method for setting the uncompressed resting height of a telescopic bicycle seatpost, while using a fixed insertion length into the bicycle frame. The assembly allows a single telescopic bicycle seatpost to fit on many different sizes of bicycle, for cyclists of varied height and leg length, while maximizing the telescoping length of the seatpost for each situation, without requiring various lengths of seatpost to be manufactured. Instead, the telescoping length of the seatpost may be adjusted for cyclists of different height, allowing for one seatpost to fit many size frames and cyclists, while allowing each individual to maximize the telescoping length for their particular setup.

22 Claims, 32 Drawing Sheets

(56) References Cited

U.S. PATENT DOCUMENTS

| | | |
|---|---|---|
| 576,548 A | 2/1897 | Cassidy |
| 579,479 A | 3/1897 | Gobbler |
| 590,685 A | 9/1897 | Matthews |
| 595,388 A | 12/1897 | Hanson |
| 598,325 A | 2/1898 | McIntyre |
| 614,900 A | 11/1898 | Seaver |
| 616,167 A | 12/1898 | Walker |
| 620,266 A | 2/1899 | Woodiska |
| 658,400 A | 9/1900 | Roberts |
| 666,679 A | 1/1901 | Kraus |
| 811,799 A | 2/1906 | Seidemann |
| 848,870 A | 4/1907 | Weller |
| 1,070,971 A | 8/1913 | Lowd |
| 1,325,206 A | 12/1919 | Raybon |
| 1,400,131 A | 12/1921 | Adams |
| 1,535,601 A | 4/1925 | Graham |
| 1,636,327 A | 7/1927 | Roe |
| 2,015,430 A | 9/1935 | Matthew |
| 2,024,499 A | 12/1935 | Baron |
| 2,139,176 A | 12/1938 | Sims |
| 2,228,770 A | 1/1941 | Le Tourneau |
| 2,317,070 A | 4/1943 | Le Tourneau |
| 2,567,785 A | 9/1951 | Rieger |
| 2,568,443 A | 9/1951 | Gerner |
| 2,751,797 A | 6/1956 | Pearl |
| 3,184,993 A | 5/1965 | Swenson |
| 3,185,439 A | 5/1965 | Inaba et al. |
| 3,303,720 A | 2/1967 | Jaulmes |
| 3,332,297 A | 7/1967 | Morse |
| D208,683 S | 9/1967 | Schreckengost |
| 3,382,734 A | 5/1968 | Hussey |
| 3,416,385 A | 12/1968 | Schenk |
| 3,477,303 A | 11/1969 | Brilando |
| 3,485,113 A | 12/1969 | Adcock |
| 3,592,076 A | 7/1971 | Baginski |
| 3,748,916 A | 7/1973 | Morse |
| 3,760,653 A | 9/1973 | Hagenah |
| 3,785,129 A | 1/1974 | Anthamatten |
| 3,807,255 A | 4/1974 | Baginski |
| 3,811,339 A | 5/1974 | Konzorr |
| 3,869,138 A | 3/1975 | Allison |
| 3,910,136 A | 10/1975 | Juy |
| 3,933,373 A | 1/1976 | Gammelgaard |
| 3,964,343 A | 6/1976 | Lauterbach |
| 3,973,447 A | 8/1976 | Nagano |
| 4,016,357 A | 4/1977 | Abrahamsen |
| 4,037,484 A | 7/1977 | Morse |
| 4,044,621 A | 8/1977 | McGregor, Sr. |
| 4,078,444 A | 3/1978 | Huret |
| 4,089,236 A | 5/1978 | Genzling |
| 4,093,325 A | 6/1978 | Troccaz |
| 4,135,727 A | 1/1979 | Camagnolo |
| 4,237,743 A | 12/1980 | Nagano |
| 4,240,303 A | 12/1980 | Mosley |
| 4,269,084 A | 5/1981 | Okajima |
| 4,298,210 A | 11/1981 | Lotteau |
| 4,302,987 A | 12/1981 | Takeda |
| 4,324,323 A | 4/1982 | Campagnolo |
| 4,330,137 A | 5/1982 | Nagano |
| 4,337,933 A | 7/1982 | Egami |
| 4,377,952 A | 3/1983 | Gamondes |
| 4,380,445 A | 4/1983 | Shimano |
| 4,398,434 A | 8/1983 | Kimura |
| 4,429,448 A | 2/1984 | Butz |
| 4,433,963 A | 2/1984 | Shimano |
| 4,439,172 A | 3/1984 | Segawa |
| 4,441,383 A | 4/1984 | Segawa |
| 4,442,732 A | 4/1984 | Okajima |
| 4,445,289 A | 5/1984 | Beneteau |
| 4,445,397 A | 5/1984 | Shimano |
| 4,472,163 A | 9/1984 | Bottini |
| 4,475,894 A | 10/1984 | Sugino |
| 4,487,424 A | 12/1984 | Ellis |
| 4,488,453 A | 12/1984 | Drugeon |
| 4,498,890 A | 2/1985 | Sutherland |
| 4,506,463 A | 3/1985 | Chassing |
| 4,507,105 A | 3/1985 | Stottmann |
| 4,515,386 A | 5/1985 | Tsujimura |
| 4,523,492 A | 6/1985 | Shimano |
| 4,538,480 A | 9/1985 | Trindle |
| 4,548,422 A | 10/1985 | Michel et al. |
| 4,573,950 A | 3/1986 | Nagano |
| 4,608,878 A | 9/1986 | Shimano |
| 4,632,416 A | 12/1986 | Zelenetz |
| 4,639,240 A | 1/1987 | Liu |
| 4,640,151 A | 2/1987 | Howell |
| 4,646,586 A | 3/1987 | Raposarda |
| 4,662,862 A | 5/1987 | Matson |
| 4,665,767 A | 5/1987 | Lassche |
| 4,686,867 A | 8/1987 | Bernard |
| 4,704,919 A | 11/1987 | Durham |
| 4,735,107 A | 4/1988 | Winkie |
| D298,613 S | 11/1988 | McMurtey |
| 4,791,692 A | 12/1988 | Collins |
| 4,803,894 A | 2/1989 | Howell |
| 4,811,626 A | 3/1989 | Bezin |
| 4,815,333 A | 3/1989 | Sampson |
| 4,827,633 A | 5/1989 | Feldstein |
| 4,832,667 A | 5/1989 | Wren |
| 4,838,115 A | 6/1989 | Nagano |
| 4,840,085 A | 6/1989 | Nagano |
| 4,854,924 A | 8/1989 | Nagano |
| 4,856,801 A | 8/1989 | Hollingsworth |
| 4,873,890 A | 10/1989 | Nagano |
| 4,882,946 A | 11/1989 | Beyl |
| 4,893,523 A | 1/1990 | Lennon |
| 4,898,063 A | 2/1990 | Sampson |
| 4,900,050 A | 2/1990 | Bishop et al. |
| 4,905,541 A | 3/1990 | Alan |
| 4,923,324 A | 5/1990 | Favrou |
| 4,928,549 A | 5/1990 | Nagano |
| 4,932,287 A | 6/1990 | Ramos |
| 4,947,708 A | 8/1990 | Lacomb |
| 4,986,949 A | 1/1991 | Trimble |
| 5,002,520 A | 3/1991 | Greenlaw |
| 5,003,841 A | 4/1991 | Nagano |
| 5,014,571 A | 5/1991 | Dapezi |
| 5,018,564 A | 5/1991 | Anglin |
| 5,019,312 A | 5/1991 | Bishop |
| 5,046,382 A | 9/1991 | Steinberg |
| 5,048,369 A | 9/1991 | Chen |
| 5,060,537 A | 10/1991 | Nagano |
| 5,067,930 A | 11/1991 | Morales |
| D323,309 S | 1/1992 | Perry |
| 5,115,692 A | 5/1992 | Nagano |
| 5,121,935 A | 6/1992 | Mathieu et al. |
| 5,125,288 A | 6/1992 | Amiet |
| 5,125,489 A | 6/1992 | Cha |
| 5,179,873 A | 1/1993 | Girvin |
| 5,188,384 A | 2/1993 | van Raemdonck |
| 5,194,051 A | 3/1993 | Nagano |
| 5,195,397 A | 3/1993 | Nagano |
| 5,203,229 A | 4/1993 | Chen |
| 5,207,768 A | 5/1993 | Gluys |
| 5,209,581 A | 5/1993 | Nagano |
| 5,215,322 A | 6/1993 | Enders |
| 5,259,270 A | 11/1993 | Lin |
| 5,301,974 A * | 4/1994 | Knapp .................. B62K 21/20 |
| | | 267/221 |
| 5,320,582 A | 6/1994 | Takeda |
| 5,324,100 A | 6/1994 | James |
| 5,326,331 A | 7/1994 | Hallock, III |
| 5,379,665 A | 1/1995 | Nagano |
| D355,872 S | 2/1995 | Haney |
| 5,419,218 A | 5/1995 | Romano |
| 5,423,233 A | 6/1995 | Peyre |
| 5,435,869 A | 7/1995 | Christensen |
| 5,451,071 A | 9/1995 | Pong et al. |
| 5,460,576 A | 10/1995 | Barnett |
| 5,496,222 A | 3/1996 | Kojima |
| 5,497,680 A | 3/1996 | Nagano |
| 5,503,600 A | 4/1996 | Berecz |
| 5,505,111 A | 4/1996 | Nagano |
| 5,522,282 A | 6/1996 | Nagano |

(56) References Cited

U.S. PATENT DOCUMENTS

| | | |
|---|---|---|
| 5,522,611 A | 6/1996 | Schmidt |
| 5,540,118 A | 7/1996 | Calendrille, Jr. |
| 5,544,907 A | 8/1996 | Lin et al. |
| 5,549,396 A | 8/1996 | Chiang |
| 5,620,384 A | 4/1997 | Kojima |
| 5,626,060 A | 5/1997 | Lin |
| 5,632,940 A | 5/1997 | Whatley |
| 5,644,953 A | 7/1997 | Leng |
| 5,676,616 A | 10/1997 | Hara |
| 5,679,084 A | 10/1997 | Daniels, III |
| 5,687,619 A | 11/1997 | Bryne |
| 5,725,450 A | 3/1998 | Huskey |
| 5,727,429 A | 3/1998 | Ueda |
| 5,728,018 A | 3/1998 | Terada |
| 5,765,450 A | 6/1998 | Kruger |
| 5,771,757 A | 6/1998 | Hanamura |
| 5,782,714 A | 7/1998 | Osgood |
| 5,788,593 A | 8/1998 | Tiong |
| 5,791,202 A | 8/1998 | Karsdon |
| 5,803,476 A | 9/1998 | Olson et al. |
| 5,806,379 A | 9/1998 | Nagano |
| 5,809,844 A | 9/1998 | Durham |
| 5,816,377 A | 10/1998 | Nakamura |
| 5,819,599 A | 10/1998 | Yamanaka |
| 5,846,148 A | 12/1998 | Fuji |
| 5,893,299 A | 4/1999 | Yamanaka |
| 5,927,155 A | 7/1999 | Jackson |
| 5,935,034 A | 8/1999 | Campagnolo |
| 5,941,135 A | 8/1999 | Schlanger |
| 5,943,795 A | 8/1999 | Ueda |
| 5,954,604 A | 9/1999 | Nakamura |
| 6,003,889 A | 12/1999 | Shalom |
| 6,014,913 A | 1/2000 | Masahiro |
| 6,014,914 A | 1/2000 | Ueda |
| 6,039,665 A | 3/2000 | Nakamura |
| 6,058,803 A | 5/2000 | Yamanaka |
| 6,059,171 A | 5/2000 | Yamanaka et al. |
| 6,059,378 A | 5/2000 | Dougherty |
| 6,060,982 A | 5/2000 | Holtrop |
| 6,083,132 A | 7/2000 | Walker |
| 6,095,691 A | 8/2000 | Chiang |
| 6,102,821 A | 8/2000 | Nakamura |
| 6,117,032 A | 9/2000 | Nankou |
| 6,165,092 A | 12/2000 | Bramham |
| 6,202,506 B1 | 3/2001 | Storck et al. |
| 6,203,459 B1 | 3/2001 | Calendrille, Jr. |
| 6,220,581 B1 * | 4/2001 | Mueller .................. B62K 19/36 267/64.11 |
| 6,264,575 B1 | 7/2001 | Lim |
| 6,266,990 B1 | 7/2001 | Shook et al. |
| 6,305,243 B1 | 10/2001 | Chiang |
| 6,314,834 B1 | 11/2001 | Smith et al. |
| 6,332,853 B1 | 12/2001 | Bowman |
| 6,354,973 B1 | 3/2002 | Barnett |
| 6,382,381 B1 | 5/2002 | Okajima et al. |
| 6,416,434 B1 | 7/2002 | Calendrille, Jr. |
| 6,428,437 B1 | 8/2002 | Schlanger |
| 6,488,603 B2 | 12/2002 | Lim et al. |
| 6,490,948 B2 | 12/2002 | Tanaka |
| 6,520,048 B2 | 2/2003 | Chen |
| 6,533,690 B2 | 3/2003 | Barnett |
| 6,564,675 B1 | 5/2003 | Jiang |
| 6,612,201 B1 | 9/2003 | Chen |
| 6,637,292 B2 | 10/2003 | Chu |
| 6,647,826 B2 | 11/2003 | Okajima |
| 6,725,742 B2 | 4/2004 | Bremer |
| 6,729,204 B1 | 5/2004 | Chen |
| 6,805,373 B2 | 10/2004 | Singenberger et al. |
| 6,848,700 B1 | 2/2005 | Fritschen |
| 6,988,427 B2 | 1/2006 | Yamanaka |
| 7,011,592 B2 | 3/2006 | Shahana et al. |
| 7,013,754 B2 | 3/2006 | Milanowski |
| 7,024,961 B2 | 4/2006 | Hsiao |
| D522,414 S | 6/2006 | Chen |
| 7,059,983 B2 | 6/2006 | Heim |
| 7,066,856 B1 | 6/2006 | Rogers |
| 7,066,857 B1 | 6/2006 | DeRosa |
| D524,195 S | 7/2006 | Neal |
| 7,108,428 B2 | 9/2006 | Ason |
| 7,118,505 B2 | 10/2006 | Lee |
| 7,131,656 B2 | 11/2006 | Valle |
| 7,174,807 B2 | 2/2007 | Bryne |
| 7,240,587 B2 | 7/2007 | Plassiard |
| 7,263,914 B2 | 9/2007 | Ording et al. |
| 7,334,500 B2 | 2/2008 | Tseng |
| 7,523,685 B2 | 4/2009 | French |
| 7,562,604 B2 | 7/2009 | Fukui |
| 7,610,832 B2 | 11/2009 | Dal Pra' |
| 7,650,817 B2 | 1/2010 | Shiraishi et al. |
| 7,753,157 B1 | 7/2010 | Woods |
| 7,770,492 B2 | 8/2010 | French |
| 7,775,128 B2 | 8/2010 | Roessingh et al. |
| 7,886,947 B2 | 2/2011 | Campagnolo |
| 7,931,553 B2 | 4/2011 | Tokuyama |
| 7,959,529 B2 | 6/2011 | Braedt |
| 8,024,993 B2 | 9/2011 | Dal Pra' et al. |
| 8,025,304 B2 | 9/2011 | Smith |
| 8,066,293 B2 | 11/2011 | Meggiolan |
| 8,197,371 B2 | 6/2012 | D'Aluisio |
| 8,235,849 B2 | 8/2012 | Carnston et al. |
| 8,267,417 B1 | 9/2012 | Yamanaka |
| 8,302,504 B2 | 11/2012 | Dal Pra' |
| 8,393,794 B1 | 3/2013 | Shiraishi |
| 8,413,769 B2 | 4/2013 | Thrash |
| 8,491,429 B2 | 7/2013 | Cranston et al. |
| 8,561,500 B2 | 10/2013 | D'Aluisio |
| 8,578,816 B2 | 11/2013 | Lin |
| 8,590,421 B2 | 11/2013 | Meggiolan et al. |
| 8,616,084 B2 | 12/2013 | Meggiolan |
| 8,641,151 B2 | 2/2014 | Kamada |
| 8,663,044 B2 | 3/2014 | Lin |
| 8,689,662 B2 | 4/2014 | Pasqua et al. |
| 8,707,823 B2 | 4/2014 | Dal Pra' |
| 8,770,061 B2 | 7/2014 | Meggiolan et al. |
| 8,820,192 B2 | 9/2014 | Staples et al. |
| 8,834,309 B2 | 9/2014 | Braedt |
| 8,863,616 B2 | 10/2014 | Ciavatta et al. |
| 8,888,629 B2 | 11/2014 | Ji |
| 8,911,314 B2 | 12/2014 | Braedt |
| 8,979,685 B2 | 3/2015 | Weagle |
| 9,003,921 B2 | 4/2015 | Weagle |
| 9,011,282 B2 | 4/2015 | Staples |
| 9,260,158 B2 | 2/2016 | Braedt |
| 9,458,871 B2 | 10/2016 | Ishizaki |
| 9,517,811 B1 | 12/2016 | Shiraishi |
| 10,160,030 B2 | 12/2018 | Earle et al. |
| 10,221,887 B2 | 3/2019 | Dubois et al. |
| 10,259,526 B2 | 4/2019 | Hsieh |
| 10,260,568 B2 | 4/2019 | Chen |
| 10,480,571 B2 | 11/2019 | Dubois et al. |
| 10,562,588 B2 | 2/2020 | Thrash et al. |
| 11,142,280 B2 | 10/2021 | Dubois et al. |
| 11,780,520 B1 * | 10/2023 | Staples ..................... B62J 1/06 297/199 |
| 2001/0049976 A1 | 12/2001 | Dodman |
| 2002/0014384 A1 | 2/2002 | Kroger |
| 2002/0028719 A1 | 3/2002 | Yamanaka |
| 2002/0160869 A1 | 10/2002 | Barnett |
| 2002/0170382 A1 | 11/2002 | Yang |
| 2002/0194951 A1 | 12/2002 | Lowe |
| 2003/0029271 A1 | 2/2003 | Shuman |
| 2003/0041689 A1 | 3/2003 | Chu |
| 2003/0051576 A1 | 3/2003 | Muraoka |
| 2003/0064844 A1 | 4/2003 | Lin |
| 2003/0171180 A1 | 9/2003 | Shahana et al. |
| 2003/0183036 A1 | 10/2003 | Chou |
| 2003/0197346 A1 | 10/2003 | Singenberger et al. |
| 2004/0009835 A1 | 1/2004 | Heim |
| 2004/0037628 A1 | 2/2004 | Meggiolan |
| 2004/0162172 A1 | 8/2004 | Yamanaka |
| 2004/0182197 A1 | 9/2004 | Chiang |
| 2004/0187635 A1 | 9/2004 | Bryne |
| 2004/0200314 A1 | 10/2004 | Hermansen et al. |
| 2004/0211289 A1 | 10/2004 | Chiang et al. |

(56) References Cited

U.S. PATENT DOCUMENTS

| | | |
|---|---|---|
| 2004/0254038 A1 | 12/2004 | Chamberlain |
| 2005/0005729 A1 | 1/2005 | Chen |
| 2005/0012298 A1 | 1/2005 | Dal Pra et al. |
| 2005/0016323 A1 | 1/2005 | Dal Pra' |
| 2005/0022625 A1 | 2/2005 | Nonoshita |
| 2005/0032596 A1 | 2/2005 | Nonoshita et al. |
| 2005/0035571 A1 | 2/2005 | Huck |
| 2005/0009034 A1 | 4/2005 | Lee |
| 2005/0081678 A1 | 4/2005 | Smith et al. |
| 2005/0081679 A1 | 4/2005 | Chen |
| 2005/0145061 A1 | 7/2005 | Ording et al. |
| 2005/0178236 A1 | 8/2005 | Crozet et al. |
| 2005/0199092 A1 | 9/2005 | Feltrin et al. |
| 2005/0217417 A1 | 10/2005 | Uchida et al. |
| 2005/0252337 A1 | 11/2005 | Chen |
| 2005/0284253 A1 | 12/2005 | Hervig |
| 2006/0029317 A1 | 2/2006 | Yamamoto |
| 2006/0063624 A1 | 3/2006 | Voss |
| 2006/0066074 A1 | 3/2006 | Turner |
| 2006/0075846 A1 | 4/2006 | Valle |
| 2006/0081088 A1 | 4/2006 | Muraoka |
| 2006/0117905 A1 | 6/2006 | Yamanaka |
| 2006/0169098 A1 | 8/2006 | Valle |
| 2006/0199690 A1 | 9/2006 | Gardner |
| 2006/0236809 A1 | 10/2006 | Bryne |
| 2006/0258499 A1 | 11/2006 | Kamada |
| 2006/0266154 A1 | 11/2006 | Hermansen |
| 2006/0288819 A1 | 12/2006 | Dal Pra' et al. |
| 2007/0034043 A1 | 2/2007 | Feltrin |
| 2007/0049436 A1 | 3/2007 | Kamada |
| 2007/0062328 A1 | 3/2007 | Shiraishi |
| 2007/0134456 A1 | 6/2007 | Fritschen |
| 2007/0137426 A1 | 6/2007 | Meggiolan et al. |
| 2007/0137432 A1 | 6/2007 | Chen |
| 2007/0182122 A1 | 8/2007 | Smith |
| 2007/0199403 A1 | 8/2007 | Ciavatta et al. |
| 2007/0204720 A1 | 9/2007 | Poyzer |
| 2007/0204722 A1 | 9/2007 | Dal Pra |
| 2007/0207631 A1 | 9/2007 | Meggiolan et al. |
| 2007/0222172 A1 | 9/2007 | Chen |
| 2007/0235986 A1 | 10/2007 | Weagle |
| 2007/0241530 A1 | 10/2007 | Nonoshita |
| 2007/0254758 A1 | 11/2007 | Chen |
| 2007/0283781 A1 | 12/2007 | Meggiolan |
| 2007/0284782 A1 | 12/2007 | Dal Pra' |
| 2007/0289406 A1 | 12/2007 | French |
| 2007/0289407 A1 | 12/2007 | French |
| 2008/0004143 A1 | 1/2008 | Kanehisa |
| 2008/0005905 A1 | 1/2008 | Valle et al. |
| 2008/0058144 A1 | 3/2008 | Oseto et al. |
| 2008/0152460 A1 | 6/2008 | Watanabe |
| 2008/0224440 A1 | 9/2008 | Masuda et al. |
| 2008/0231014 A1 | 9/2008 | Braedt |
| 2008/0234082 A1 | 9/2008 | Braedt |
| 2008/0272572 A1 | 11/2008 | Tsai |
| 2008/0289927 A1 | 11/2008 | Ji |
| 2008/0307652 A1 | 12/2008 | Chiang |
| 2008/0314193 A1 | 12/2008 | Meggiolan |
| 2009/0042682 A1 | 2/2009 | Dal Pra |
| 2009/0056495 A1 | 3/2009 | Bischoff et al. |
| 2009/0056496 A1 | 3/2009 | Dodman et al. |
| 2009/0078081 A1 | 3/2009 | French |
| 2009/0095122 A1 | 4/2009 | Weagle |
| 2009/0145262 A1 | 6/2009 | Pasqua et al. |
| 2009/0151509 A1 | 6/2009 | French |
| 2009/0191996 A1 | 7/2009 | D'Aluisio |
| 2009/0236777 A1 | 9/2009 | Chiang |
| 2009/0243250 A1 | 10/2009 | Chiang |
| 2009/0261553 A1 | 10/2009 | Meggiolan |
| 2010/0009794 A1 | 1/2010 | Chiang |
| 2010/0058889 A1 | 3/2010 | Dal Pra |
| 2010/0064845 A1 | 3/2010 | French |
| 2010/0099530 A1 | 4/2010 | Chiang et al. |
| 2010/0229675 A1 | 9/2010 | Dodman et al. |
| 2010/0236356 A1 | 9/2010 | Dodman |
| 2010/0275724 A1 | 11/2010 | Staples et al. |
| 2010/0295265 A1 | 11/2010 | Burdick |
| 2011/0011202 A1 | 1/2011 | Lin |
| 2011/0105263 A1 | 5/2011 | Braedt |
| 2011/0130233 A1 | 6/2011 | Tokuyama |
| 2011/0140390 A1 | 6/2011 | Kuroiwa et al. |
| 2011/0204201 A1 | 8/2011 | Kodama |
| 2011/0290069 A1 | 12/2011 | Lin |
| 2012/0067675 A1 | 3/2012 | Thrash |
| 2012/0119565 A1 | 5/2012 | Kamada |
| 2012/0225745 A1 | 9/2012 | Oishi |
| 2012/0260767 A1 | 10/2012 | D'Aluisio |
| 2012/0302384 A1 | 11/2012 | Braedt |
| 2013/0053195 A1 | 2/2013 | Emura et al. |
| 2013/0053196 A1 | 2/2013 | Emura et al. |
| 2013/0068066 A1 | 3/2013 | Staples et al. |
| 2013/0114999 A1 | 5/2013 | Ostling |
| 2013/0225343 A1 | 8/2013 | Spahr et al. |
| 2014/0157951 A1 | 6/2014 | Dubois et al. |
| 2014/0179474 A1 | 6/2014 | Florczyk |
| 2014/0345419 A1 | 11/2014 | Staples et al. |
| 2015/0020621 A1 | 1/2015 | Kawakami |
| 2015/0024884 A1 | 1/2015 | Braedt |
| 2015/0210353 A1 | 7/2015 | Tokuyama et al. |
| 2016/0167737 A1 | 6/2016 | Tokuyama |
| 2016/0176447 A1 | 6/2016 | Bernardele |
| 2016/0236749 A1 | 8/2016 | Cody |
| 2016/0272002 A1 | 9/2016 | Earie |
| 2017/0057598 A1 | 3/2017 | Thrash et al. |
| 2017/0101124 A1 | 4/2017 | Assmann |
| 2017/0274960 A1 | 9/2017 | Dubois et al. |
| 2017/0314665 A1 | 11/2017 | Garcia |
| 2018/0022415 A1 | 1/2018 | Oishi |
| 2018/0057087 A1* | 3/2018 | Jhou ............... F15B 15/202 |
| 2018/0148126 A1 | 5/2018 | Tetsuka |
| 2018/0170479 A1 | 6/2018 | Furuya |
| 2018/0257742 A1 | 9/2018 | Chen |
| 2018/0297664 A1 | 10/2018 | Fukumori |
| 2018/0334212 A1* | 11/2018 | Bowers ................. B62K 3/02 |
| 2018/0346064 A1 | 12/2018 | Fijita |
| 2019/0047649 A1* | 2/2019 | Chiesa ................ B62J 1/06 |
| 2019/0054765 A1 | 2/2019 | Thrash |
| 2019/0093749 A1 | 3/2019 | Bisarello |
| 2019/0154083 A1 | 5/2019 | Dubois et al. |
| 2019/0233051 A1 | 8/2019 | Carrasco Vergara |
| 2019/0241233 A1 | 8/2019 | Tavares Miranda |
| 2020/0009907 A1 | 1/2020 | Cotter et al. |
| 2020/0140034 A1 | 5/2020 | Thrash et al. |
| 2020/0223255 A1 | 7/2020 | Kamada |
| 2020/0354016 A1 | 11/2020 | Di Serio |
| 2021/0094642 A1* | 4/2021 | Dubois ................. B62J 1/06 |
| 2021/0171153 A1 | 6/2021 | Nichols |
| 2022/0041248 A1 | 2/2022 | Jordan |
| 2022/0111919 A1* | 4/2022 | Staples ................. B62J 1/08 |
| 2023/0322318 A1* | 10/2023 | Staples ............... B62K 19/36 |
| | | 297/209 |
| 2024/0043090 A1 | 2/2024 | Caillaud |

FOREIGN PATENT DOCUMENTS

| | | |
|---|---|---|
| TW | 568044 | 12/2003 |
| TW | 201507920 | 3/2015 |
| TW | M605175 | 12/2020 |
| TW | I794653 | 3/2023 |

OTHER PUBLICATIONS

Invention Patent Decision dated Oct. 24, 2022 of the Intellectual Property Office of the Ministry of Economic Affairs in Taiwan Application No. 109133450.

International Search Report, mailed Jun. 9, 2022, for International Application No. PCT/US22/21360.

The Examination Notification dated Jun. 28, 2022 for Taiwanese Application No. 107129023.

The Notice of Allowance dated Sep. 14, 2023 from the Taiwanese Patent Application No. 107129023.

EP Official Letter dated Mar. 4, 2022 in European Application No. 16 842 566.8-1009.

(56) References Cited

OTHER PUBLICATIONS

Office Action dated Mar. 14, 2022 in Chinese Application No. 201880064395.8.
The International Preliminary Report on Patentability for PCT Application No. PCT/US2021/041529.
The Machine Translation of JP 2019142351.
Machine translation of DE 10 2006 015 582.
The International Preliminary Report dated Oct. 5, 2023 from the International Patent Application No. PCT/US2022/021360.
The Official Letter dated Oct. 6, 2022 for European Application No. 17770865.8.
The Request for Patent Invalidation dated Jun. 26, 2023 from the Taiwanese Patent Application No. 109133450.
Translation of DE-202018103890-U1, Nov. 14, 2019 (Year: 2019).
The Official Letter from European Application No. 16 842 566.8-1009, dated Jan. 17, 2024.
The Notification of Transmittal of the International Search Report and the Written Opinion of the International Search Authority from International Application No. PCT/US23/79485, dated Mar. 1, 2024.
The Notice of Intention to Grant from European Application No. 17 770 865.8-1012, dated Mar. 19, 2024.
The office action from the Taiwan Application No. 109133450 dated Jan. 5, 2022.

\* cited by examiner

PRIOR ART

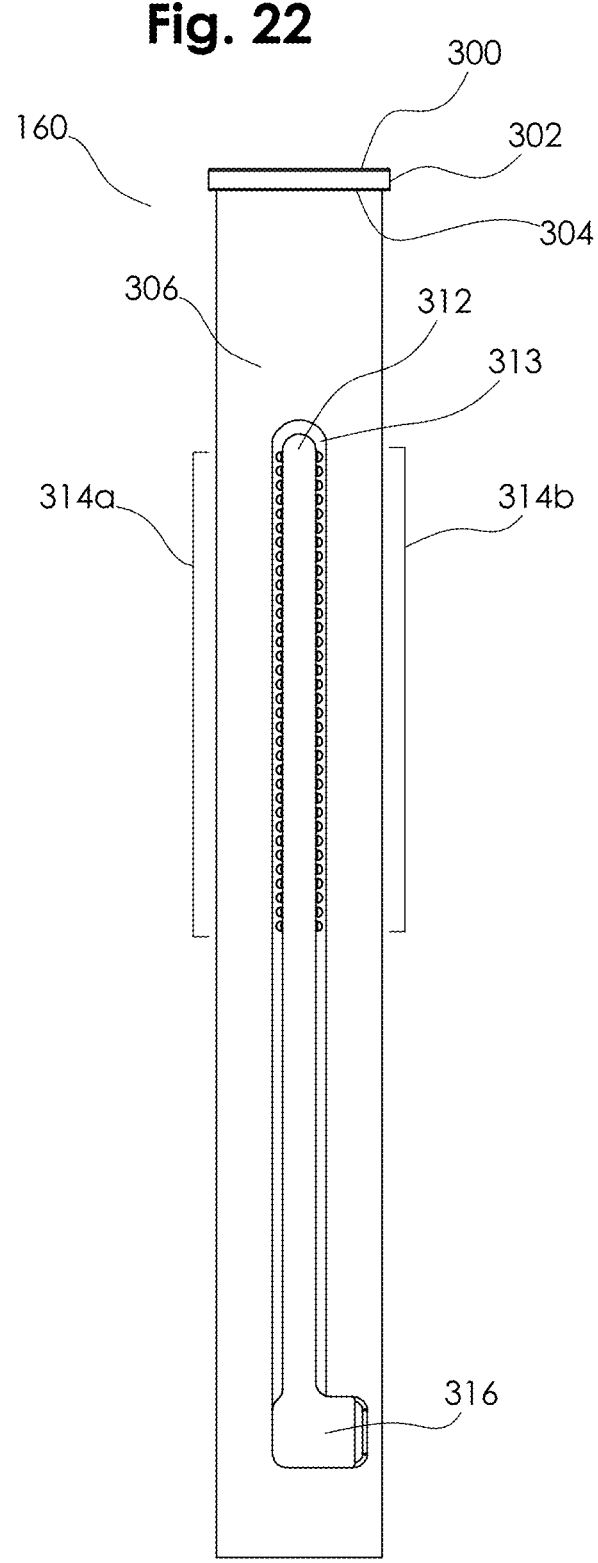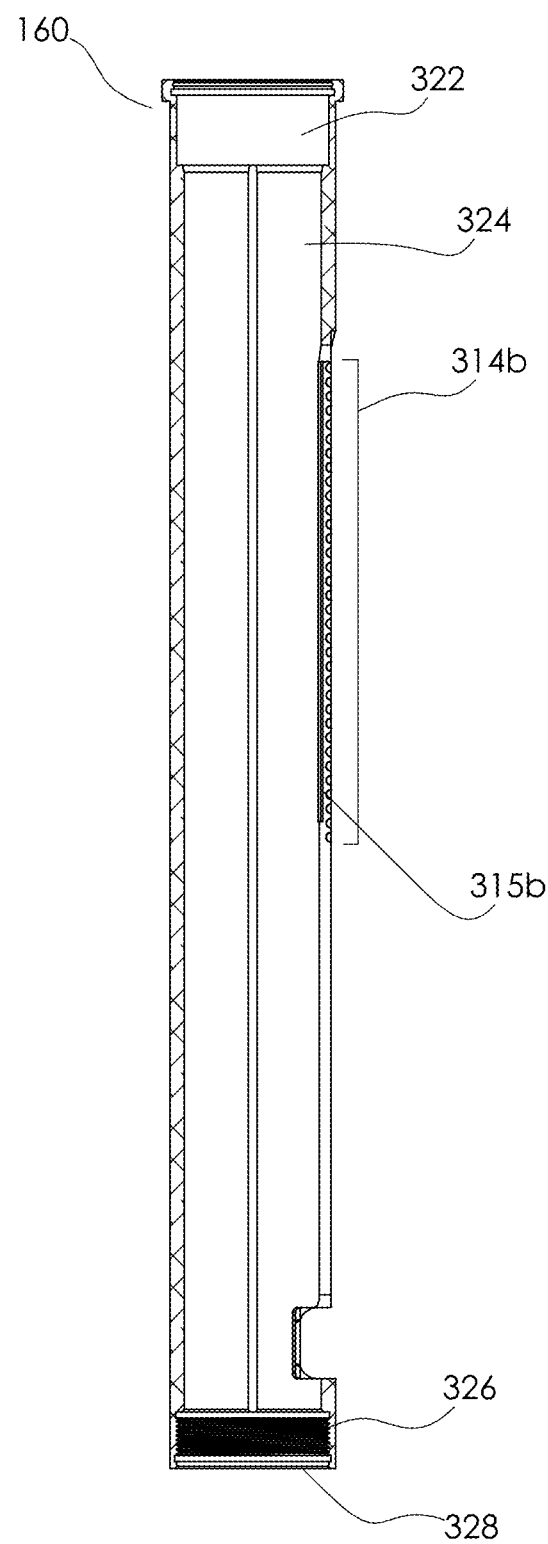

Fig. 37
Fig. 38
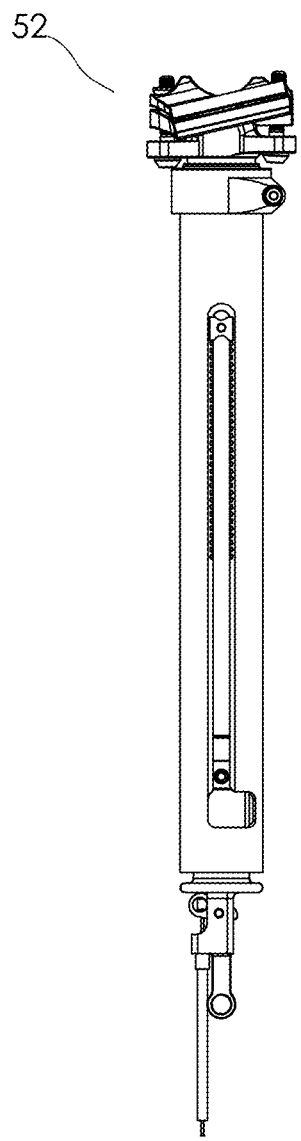
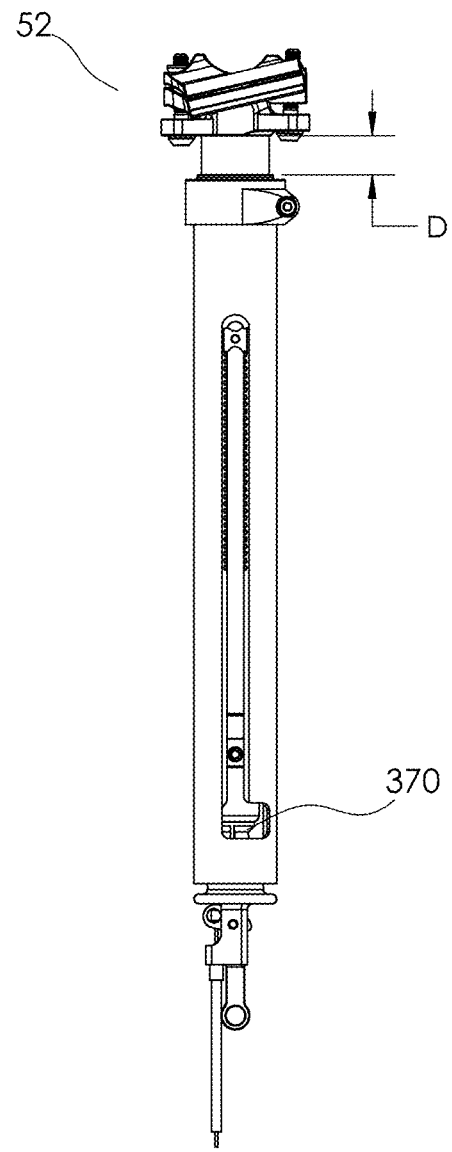

Fig. 45　　　　　Fig. 46
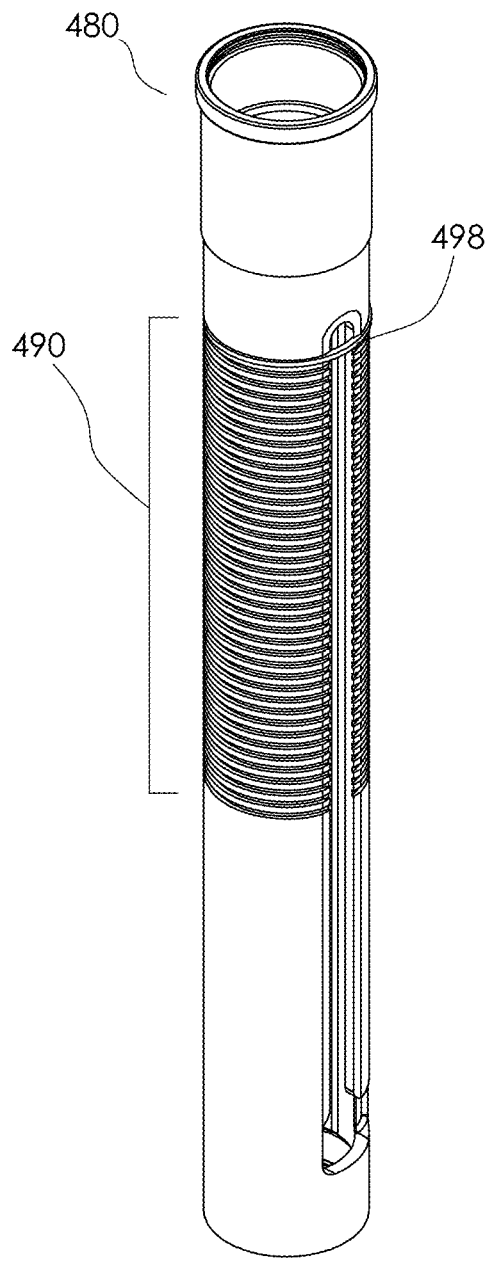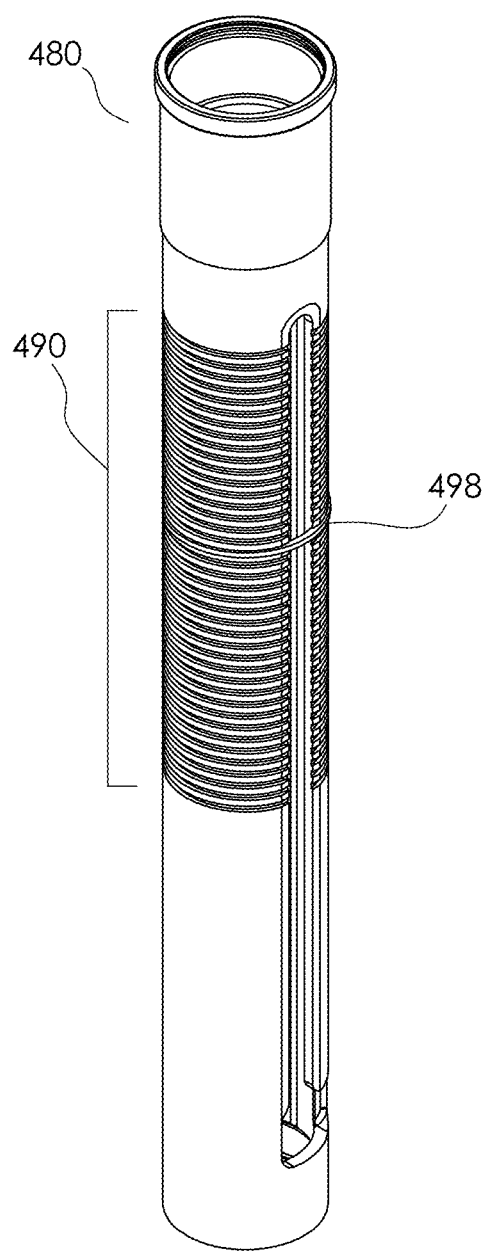

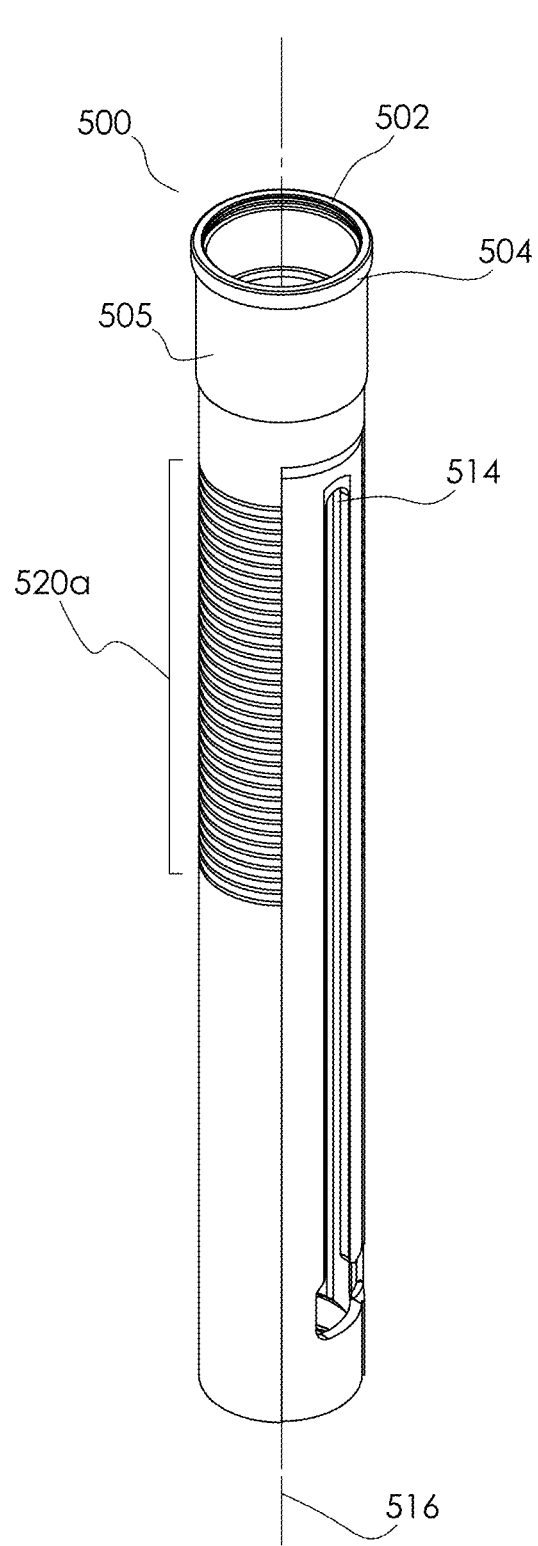
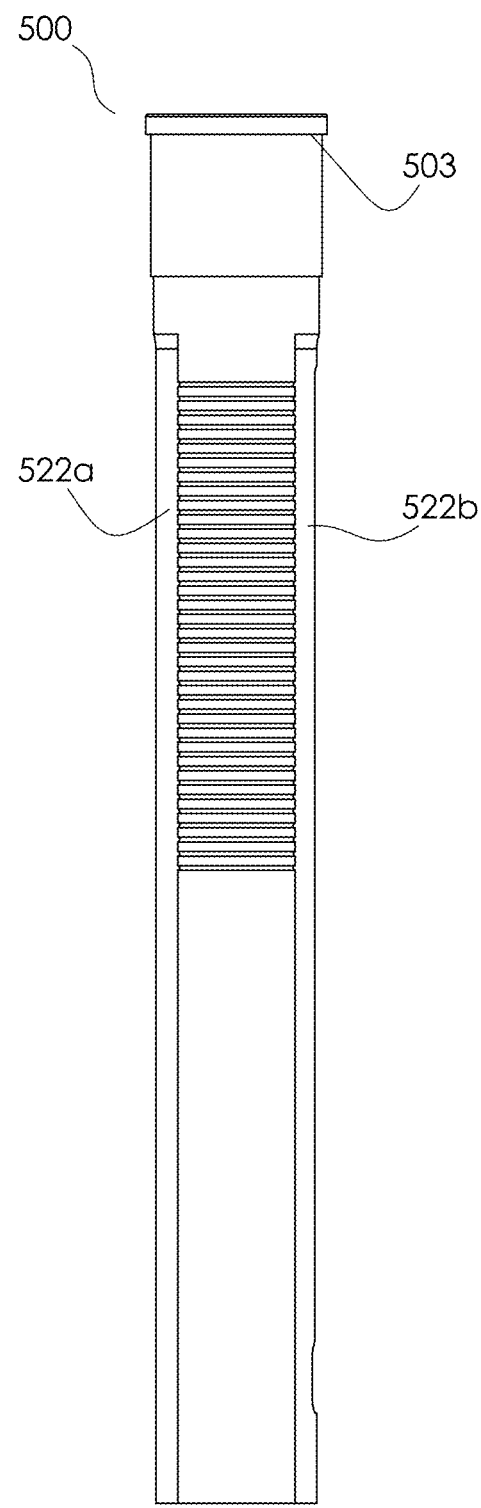
Fig. 47
Fig. 48

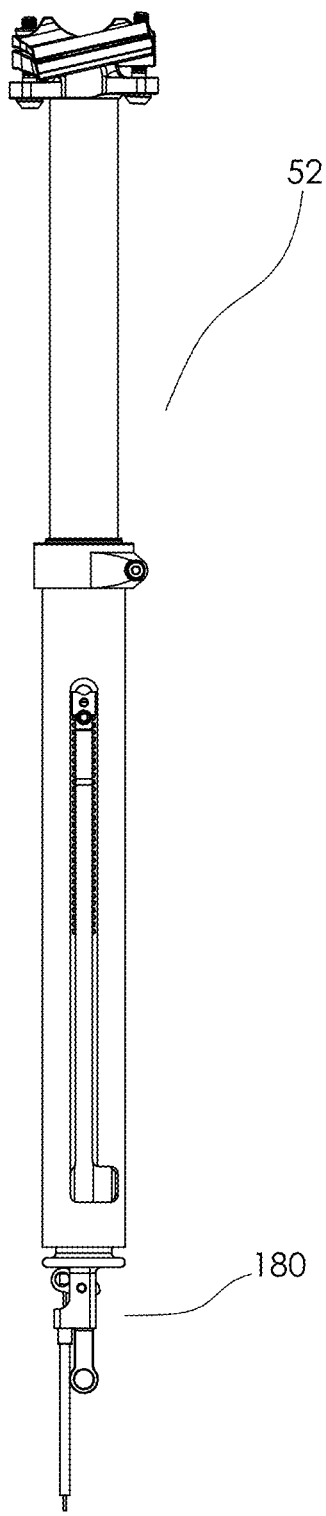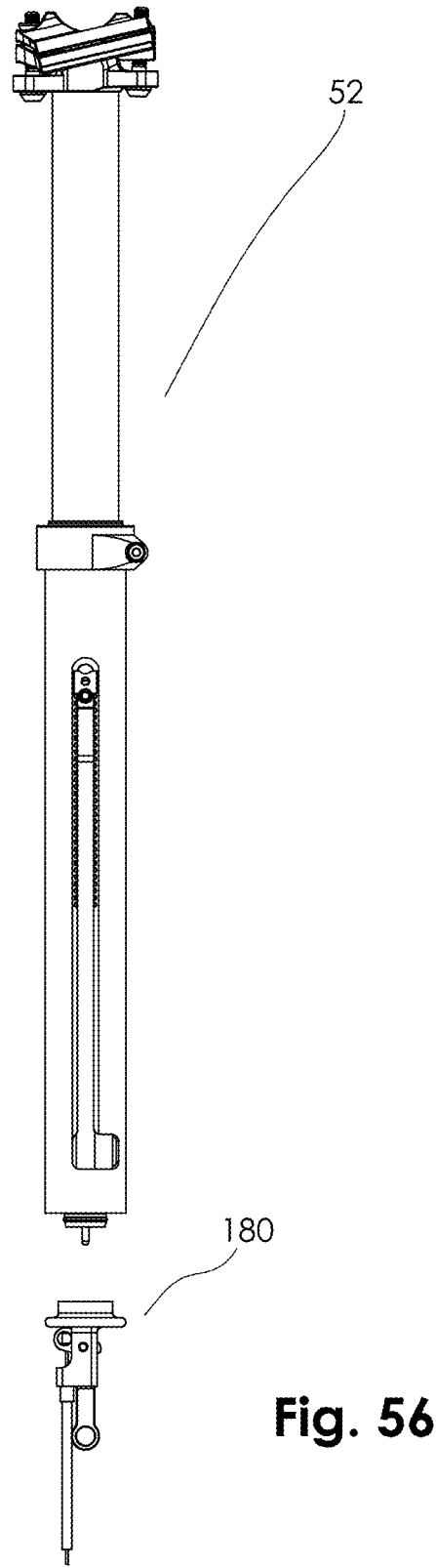
Fig. 55
Fig. 56

TELESCOPIC BICYCLE SEATPOST WITH ADJUSTABLE HEIGHT AND FIXED FRAME INSERTION

CROSS-REFERENCE TO RELATED APPLICATION(S)

This application claims priority under 35 U.S.C. § 119(e) of the U.S. Provisional Patent Application Ser. No. 63/166,792, filed Mar. 26, 2021 and titled, "Telescopic Bicycle Seatpost with Adjustable Height and Fixed Frame Insertion," which is hereby incorporated by reference in its entirety for all purposes.

FIELD OF THE INVENTION

The present invention relates to bicycles. More specifically, the present invention relates to an adjustable bicycle seatpost.

BACKGROUND OF THE INVENTION

Many bicycles today utilize a telescopic seatpost, which allows for the height of the seat to be varied during the course of a ride to suit riding over different kinds of terrain. For instance, on steep descents a cyclist might compress the seatpost on the fly, without stopping forward progress, and lower their saddle, so they might move their body more rearward over the bicycle. Conversely, they might raise the saddle to its full height while climbing to allow full leg extension during pedaling in the seated position.

For a given bicycle frame, often a cyclist would like to use a telescopic seatpost with the maximum amount of on-the-fly, telescopic height adjustment possible. However, because resting saddle height should be set to accommodate the length of a cyclist's legs, if a telescopic seatpost with a fixed telescoping length is used, some telescoping length is sacrificed to allow varied insertion of the seatpost in the frame for optimum bicycle fit.

Consequently, seatpost manufacturers frequently make telescopic seatposts with many different fixed telescopic length versions to allow cyclists of various heights to set up their bicycles properly, by choosing the seatpost model that can work for them. Meanwhile, regardless of which length seatpost is selected, some telescopic length will be given up, since manufacturers typically make 2-4 lengths of seatpost in 20-30 mm increments of length, as it becomes impractical to make seatposts in finer graduations of length.

SUMMARY OF THE INVENTION

A novel telescopic, height adjustable, bicycle seatpost with a fixed frame insertion length, but adjustable uncompressed resting height is described herein.

This telescopic bicycle seatpost with adjustable height and fixed frame insertion provides a unique structure and method for setting the uncompressed resting height of a telescopic bicycle seatpost, while using a fixed insertion length into the bicycle frame.

The resting length may be adjusted by various means described within, allowing the maximum amount of seatpost compression for a given rider on any given bicycle frame.

The assembly described herein allows a single telescopic bicycle seatpost to fit on many different sizes of bicycle, for cyclists of varied height and leg length, while maximizing the telescoping length of the seatpost for each situation, without requiring various lengths of seatpost to be manufactured. Instead, the telescoping length of the seatpost may be adjusted for cyclists of different height, allowing for one seatpost to fit many size frames and cyclists, while allowing each individual to maximize the telescoping length for their particular setup.

In addition, the assembly eliminates the outer seatpost tube typically found in telescopic bicycle seatposts. Instead, the assembly fits entirely within the seat tube of the bicycle frame. Ordinary height adjustable seatposts allow adjustment of the height of the entire seatpost assembly by using a circumferential clamp on the seat tube of the bicycle, where the seat post height is adjusted by loosening the clamp, then sliding the seat post up and down within the frame to achieve the appropriate height, then tightening the clamp.

The assembly replaces this seatpost clamp with an attachment method whereby the upper seal and bushing assembly of the post is directly attached to the frame itself, eliminating the sliding outer seatpost tube. Eliminating the tube saves weight and allows the maximum telescoping height of the seatpost assembly to be utilized.

BRIEF DESCRIPTION OF THE DRAWINGS

FIG. 22 shows a left view of said lower tube according to some embodiments.

FIG. 23 shows a right section view of said lower tube, which also comprises a bushing relief diameter, an inner bearing diameter, a lower cap thread, a right adjuster retention cutout and a lower tube bottom surface according to some embodiments.

FIG. 37 shows the adjustable seatpost assembly in the fully compressed position according to some embodiments.

FIG. 38 shows the adjustable seatpost assembly set to compressed height D, by installing compression stop limiter to set the full compression distance, where said compression stop limiter is fitted onto cartridge shaft according to some embodiments.

FIG. 45 shows a top front right view of first alternative lower tube with said height adjustment snap ring installed in the highest 1a height adjustment grooves according to some embodiments.

FIG. 46 shows a top front right view of first alternative lower tube with said height adjustment snap ring installed in a middle position 1a height adjustment grooves according to some embodiments.

FIG. 47 shows a top rear right view of a second alternative lower tube according to some embodiments.

FIG. 48 shows a right side view of said second alternative lower tube, including a lower tube flange bottom surface according to some embodiments.

FIG. 55 shows the adjustable seatpost assembly in the fully extended position as it would be configured when installed in second complete bicycle assembly, where the seatpost actuator assembly is in the operable position, connected to the seatpost locating frame hole (not pictured) according to some embodiments.

FIG. 56 shows the adjustable seatpost assembly in the fully extended position as it would be configured when removed from second complete bicycle assembly, where the seatpost actuator assembly remains in the bicycle frame, attached to the bicycle seat tube according to some embodiments.

DETAILED DESCRIPTION OF THE PREFERRED EMBODIMENT

Figure 1:
FIG. 1 shows a right side view of a prior art complete bicycle assembly for reference.

FIG. 1 shows a prior art bicycle assembly 10 from the right side view for reference. Said prior art bicycle assembly 10 includes a first bicycle seat tube 12, a first bicycle seat tube axis 14, and a first bicycle saddle 16. A typical telescopic seatpost 18 (for example) is shown installed in the first bicycle seat tube 12 in the extended configuration. A first bicycle crank assembly 20 is shown installed in the first bicycle frame 22.

Figure 2:
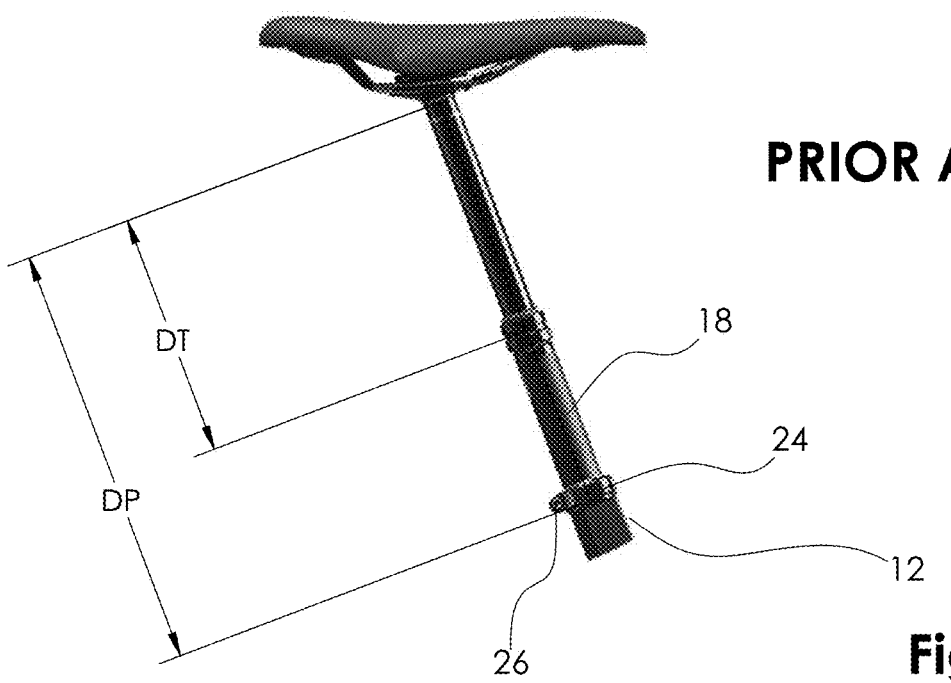
FIG. 2 shows a detailed view of the prior art complete bicycle assembly for reference.

FIG. 2 shows a detailed view of said prior art bicycle assembly 10, and includes said typical telescopic seatpost 18 and first bicycle seat tube 12, and shows a typical first bicycle seatpost clamp 24, including a first seatpost clamp screw 26. The view indicates typical seatpost drop distance DT, and typical seatpost protrusion distance DP.

Figure 3:
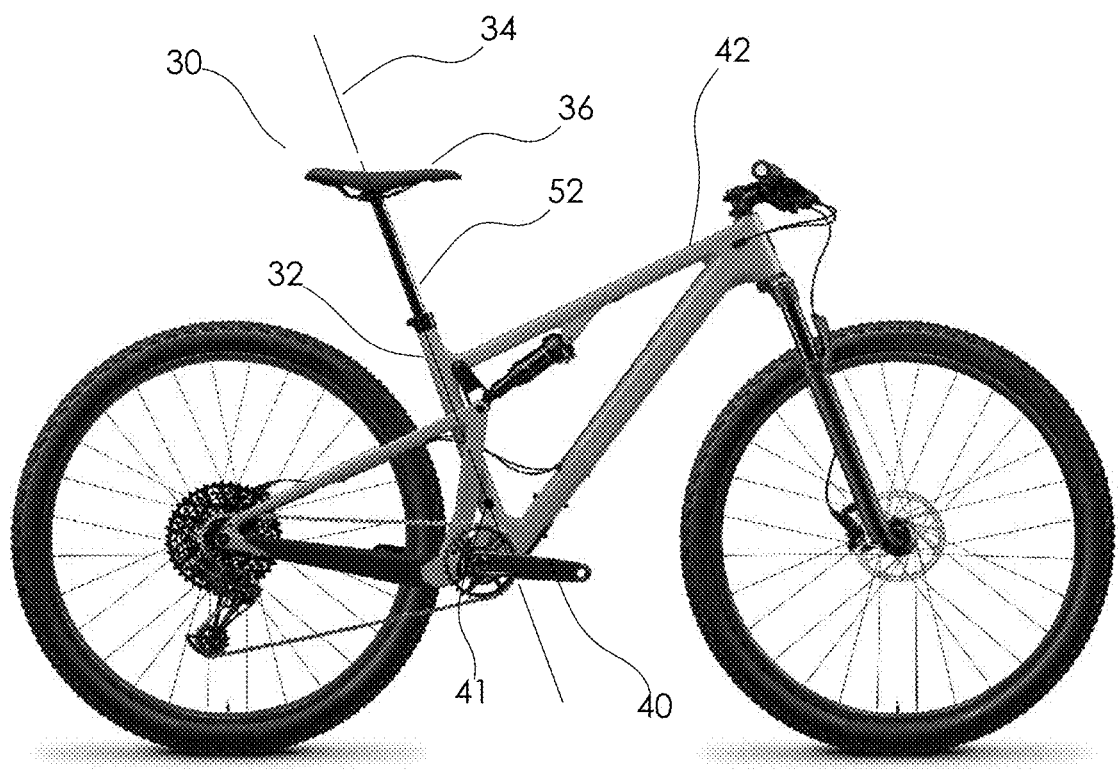
FIG. 3 shows a right side view of a complete bicycle assembly according to some embodiments.

FIG. 3 shows a complete bicycle assembly 30 from the right side according to some embodiments. Said assembly includes a bicycle frame 42 comprising a bicycle seat tube 32 and a bicycle seat tube axis 34, and also includes a bicycle saddle 36 and a bicycle crank assembly 40, and a seatpost locating frame hole 41. The adjustable seatpost assembly 50 is shown installed in the bicycle seat tube 32 in the extended operating position.

Figure 4:
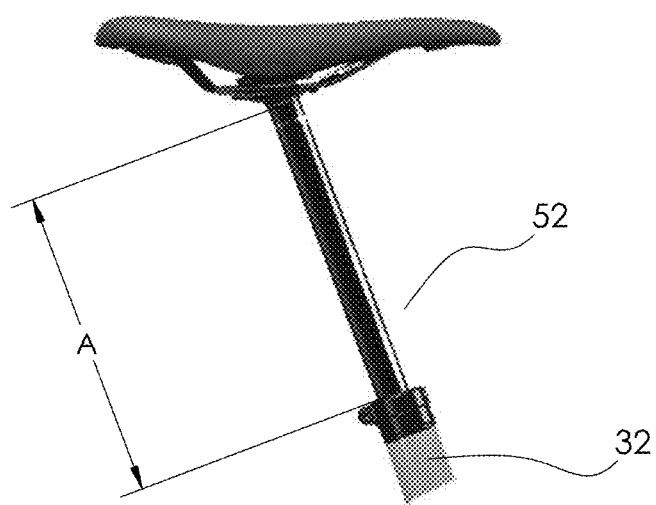
FIG. 4 shows a detailed view of said adjustable seatpost assembly installed in said bicycle seat tube and displaying the extended seatpost length A according to some embodiments.

FIG. 4 is a detail view of said adjustable seatpost assembly 52 installed in said bicycle seat tube 32, and displaying the extended seatpost length A according to some embodiments.

Figure 5:
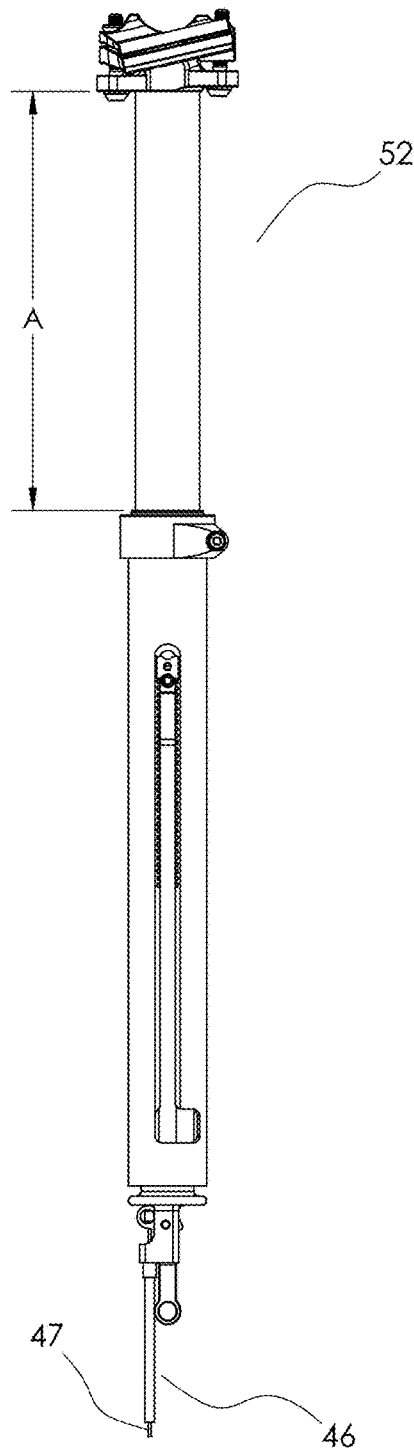
FIG. 5 shows said adjustable seatpost assembly free of the bicycle frame and in the maximum extended height B position, and shows the dummy cable housing assembly, including an actuation cable, installed in the seatpost according to some embodiments.

FIG. 5 shows said adjustable seatpost assembly 52 free of the bicycle frame and in the maximum extended height B position, and shows the dummy cable housing assembly 46, including an actuation cable 47, installed in the seatpost according to some embodiments.

Figure 6:
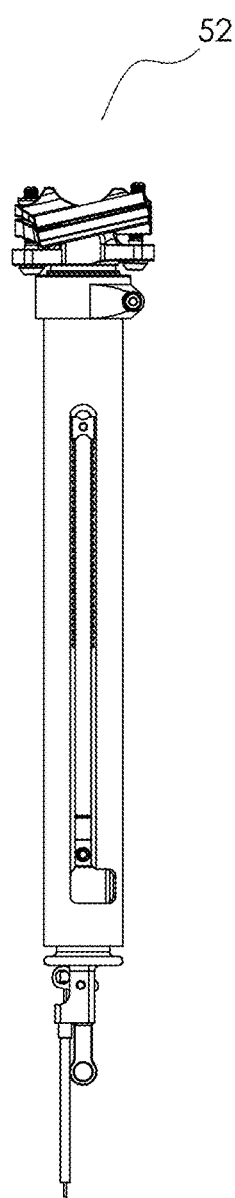
FIG. 6 shows said adjustable seatpost assembly free of the bicycle frame and in the fully compressed position according to some embodiments.
Figure 7:
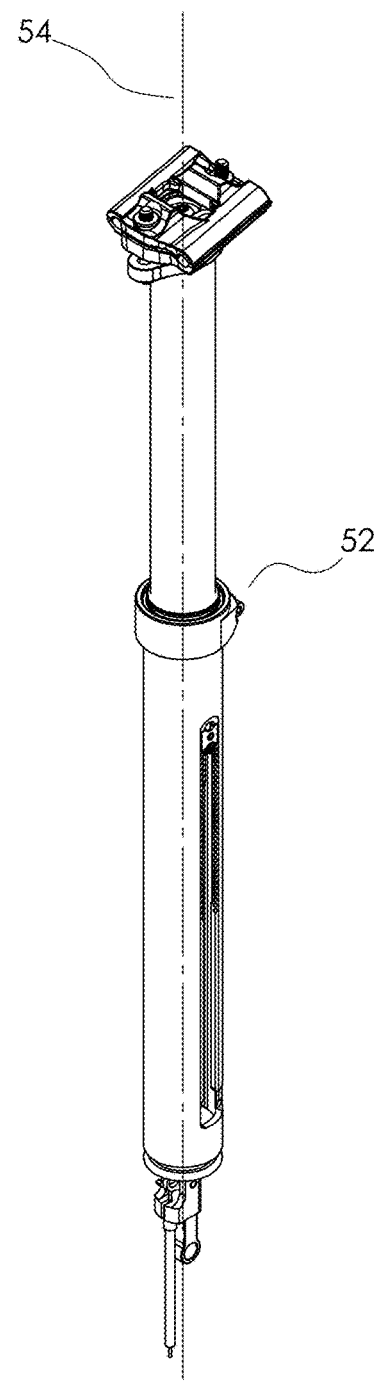
FIG. 7 shows said adjustable seatpost assembly and indicates the seatpost center axis according to some embodiments.
Figure 8:
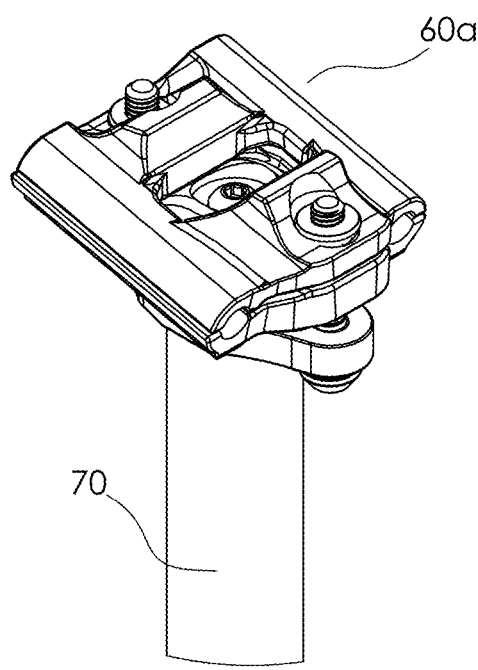
FIG. 8 shows a detailed view of assembled seatpost head assembly assembled in the low saddle position, including a seatpost stanchion tube according to some embodiments.

FIG. 6 shows said adjustable seatpost assembly 52 free of the bicycle frame and in the fully compressed position according to some embodiments. FIG. 7 shows said adjustable seatpost assembly 52, and indicates the seatpost center axis 54 according to some embodiments. FIG. 8 shows a detailed view of assembled seatpost head assembly 60a assembled in the low saddle position, including a seatpost stanchion tube 70 according to some embodiments.

Figure 9:
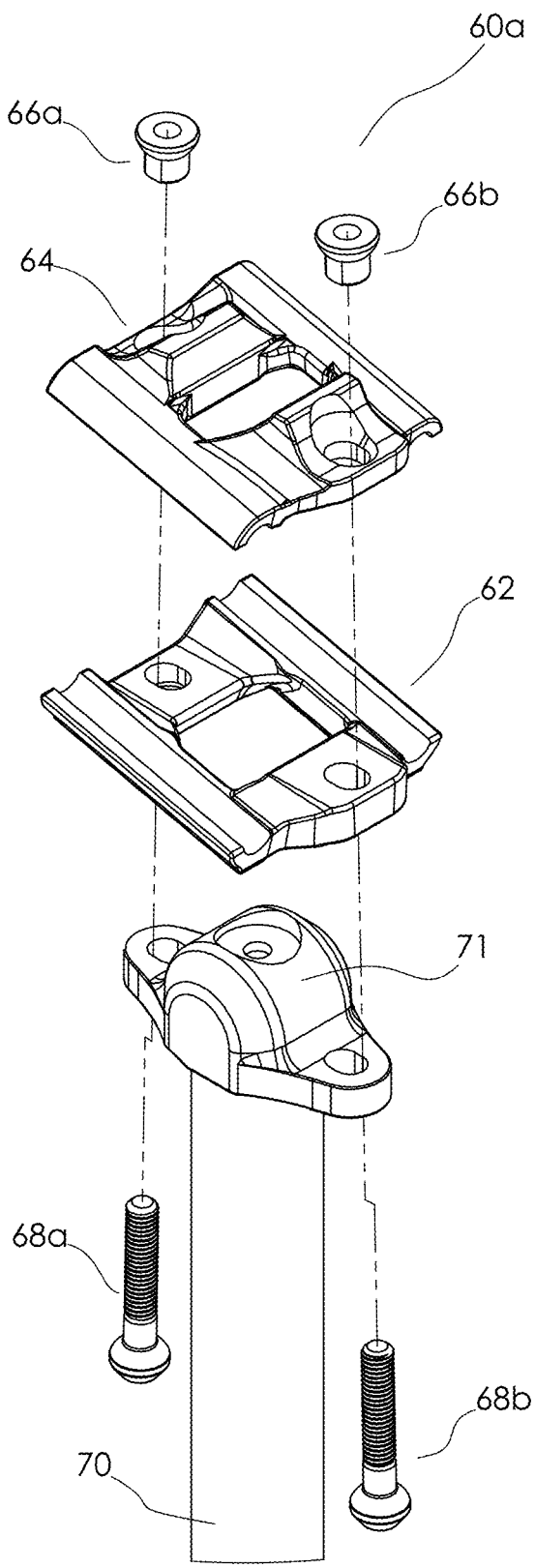
FIG. 9 shows an exploded view of said seatpost head assembly, including a low rail saddle plate, a high rail saddle plate, two saddle clamp t-nuts, two saddle clamp screw, and said seatpost stanchion tube comprising a saddle clamp cylindrical rest surface according to some embodiments.

FIG. 9 shows an exploded view of said seatpost head assembly 60a, including a low rail saddle plate 62, a high rail saddle plate 64, two saddle clamp t-nuts 66a and 66b, two saddle clamp screw 68a and 68b, and said seatpost stanchion tube 70 comprising a saddle clamp cylindrical rest surface 71 according to some embodiments.

Figure 10:
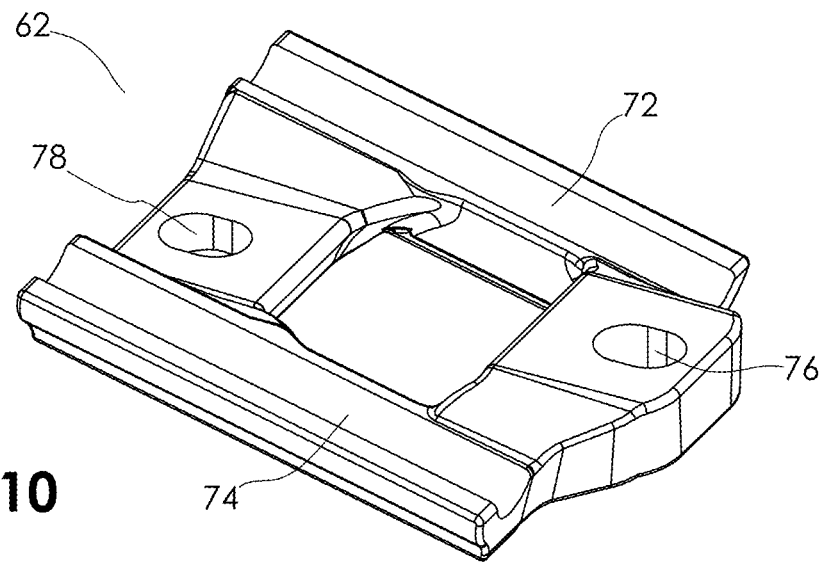
FIG. 10 shows a top front right isometric view of said low rail saddle plate, including a left low saddle rail groove, a right low saddle rail groove, a front low screw slot and a rear low screw slot according to some embodiments.

FIG. 10 shows a top front right isometric view of said low rail saddle plate 62, including a left low saddle rail groove 72, a right low saddle rail groove 74, a front low screw slot 76 and a rear low screw slot 78 according to some embodiments.

Figure 11:
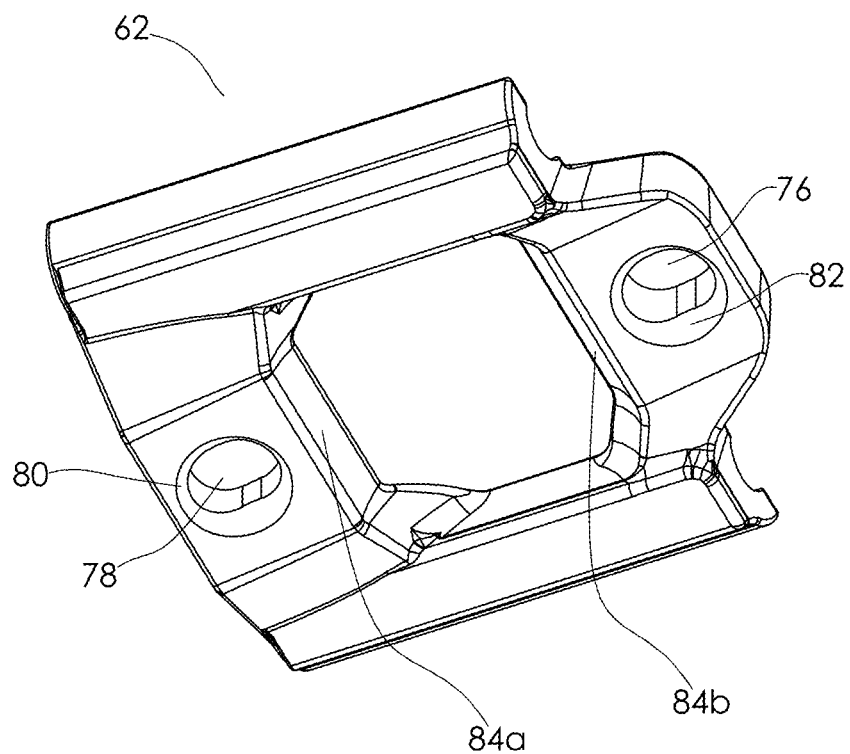
FIG. 11 shows a bottom right front isometric view of said low rail saddle plate, indicating once again the front low screw slot and rear low screw slot according to some embodiments.

FIG. 11 shows a bottom right front isometric view of said low rail saddle plate 62, indicating once again the front low screw slot 76 and rear low screw slot 78 according to some embodiments. Visible from this angle are a rear low hemispherical relief 80, front low hemispherical relief 82, and the rear low pivot cylinder surface 84a and front low pivot cylinder surface 84b.

Figure 12:
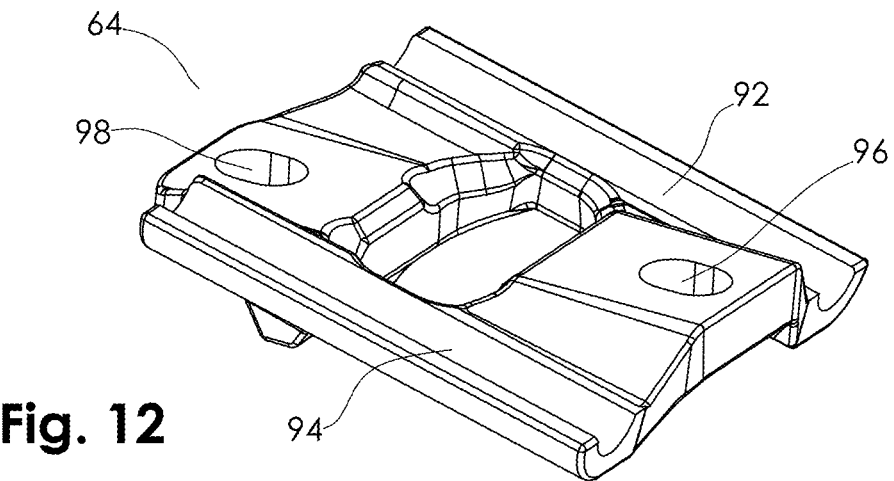
FIG. 12 shows a top front right isometric view of said high rail saddle plate, including a left high saddle rail groove, a right high saddle rail groove, a front high screw slot and a rear high screw slot according to some embodiments.

FIG. 12 shows a top front right isometric view of said high rail saddle plate 64, including a left high saddle rail groove 92, a right high saddle rail groove 94, a front high screw slot 96 and a rear high screw slot 98 according to some embodiments.

Figure 13:
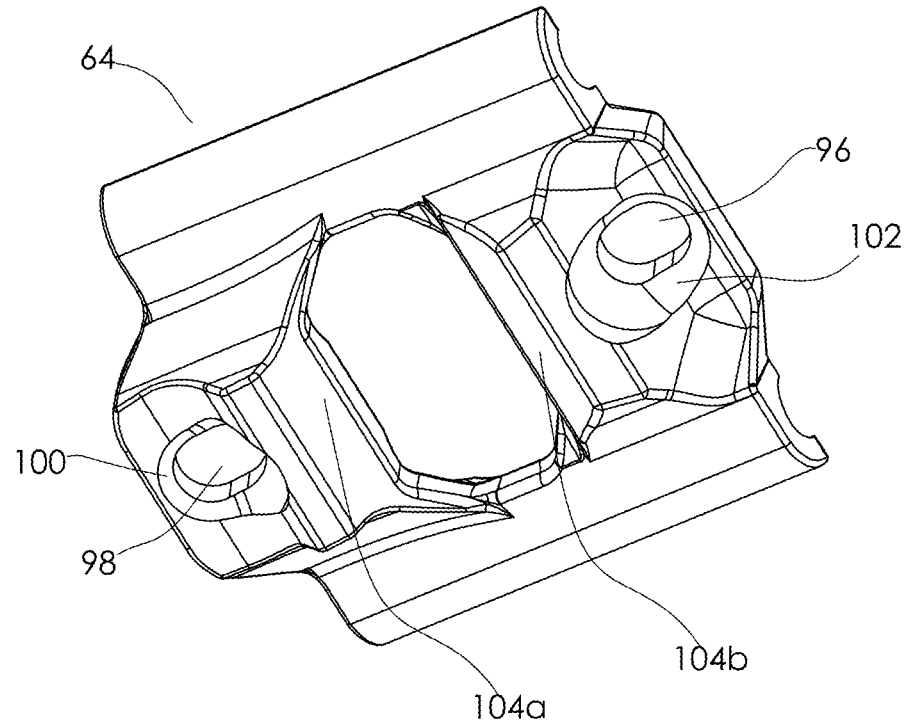
FIG. 13 shows a bottom right front isometric view of said high rail saddle plate, indicating once again the front high screw slot and rear high screw slot according to some embodiments.

FIG. 13 shows a bottom right front isometric view of said high rail saddle plate 64, indicating once again the front high screw slot 96 and rear high screw slot 98 according to some embodiments. Visible from this angle are a rear high hemispherical relief 102, front high hemispherical relief 100, and the rear high pivot cylinder surface 104a and front high pivot cylinder surface 104b.

Figure 14:
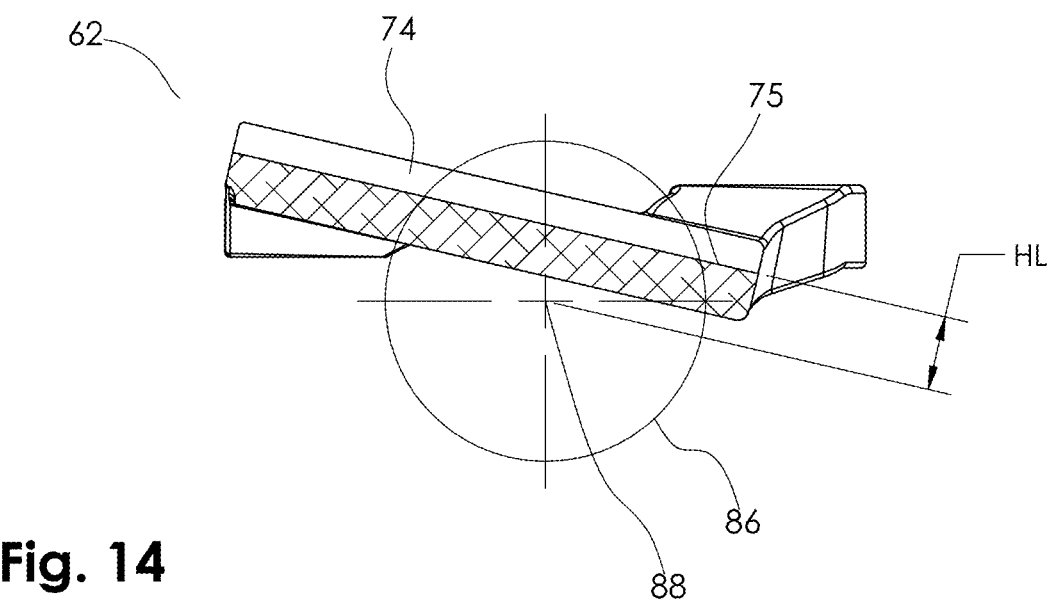
FIG. 14 is a right section view of said low rail saddle plate according to some embodiments.

FIG. 14 is a right section view of said low rail saddle plate 62 according to some embodiments. Shown again is the right low saddle rail groove 74 comprising a low rail saddle index line 75. Also shown are a low pivot cylinder 86, and a low pivot cylinder axis 88, and a low saddle support distance HL.

Figure 15:
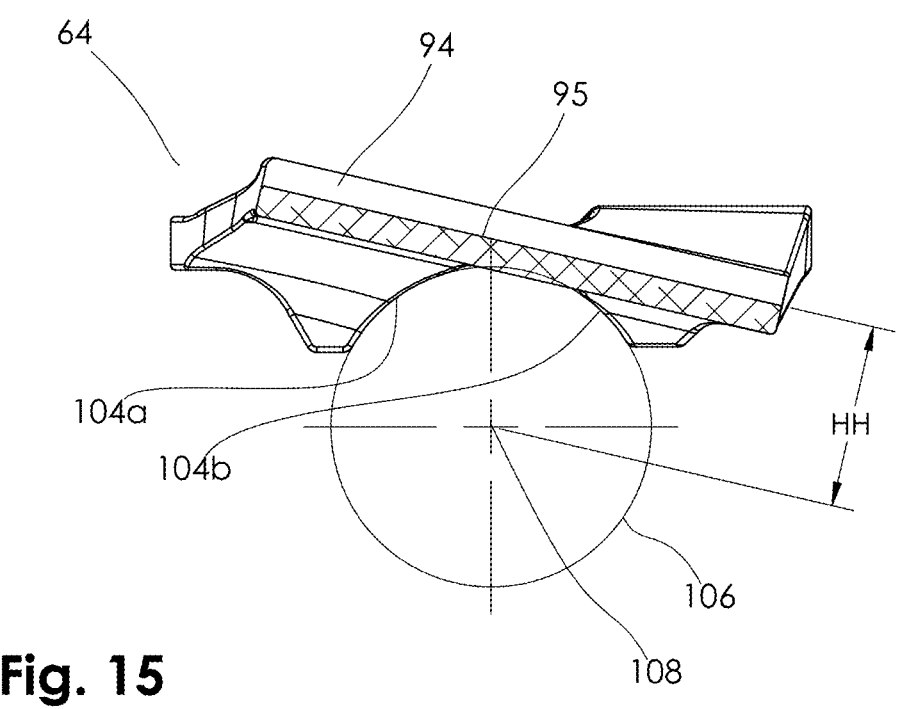
FIG. 15 is a right section view of said high rail saddle plate according to some embodiments.

FIG. 15 is a right section view of said high rail saddle plate 64. Shown again is the right high saddle rail groove 94 comprising a high rail saddle index line 95 according to some embodiments. Also shown are a low pivot cylinder 106, and a high pivot cylinder axis 108, and a high saddle support distance HH.

Figure 16:
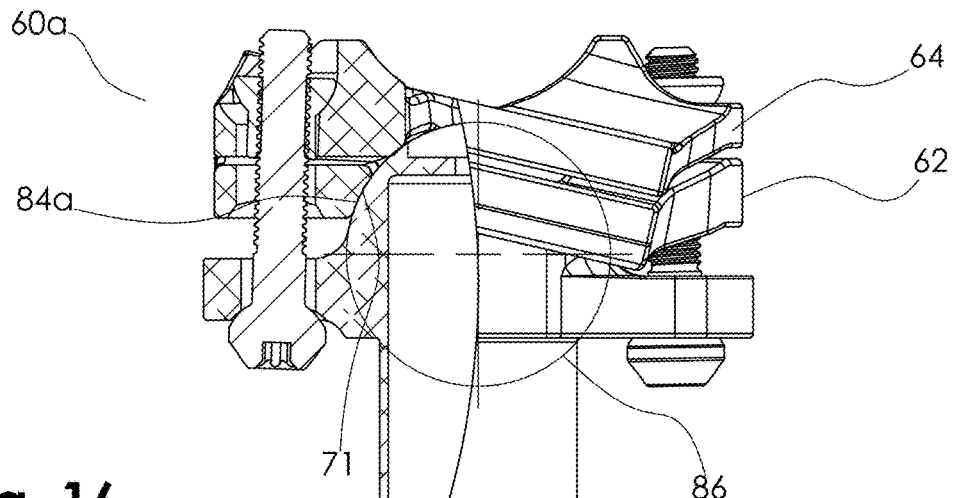
FIG. 16 is a right partial section of said seatpost head assembly assembled in the low saddle configuration, including said low saddle rail plate and said high saddle rail plate according to some embodiments.

FIG. 16 is a right partial section of said seatpost head assembly 60a assembled in the low saddle configuration, including said low saddle rail plate 62 and said high saddle rail plate 64 according to some embodiments. Rear low pivot cylinder surface 84a is shown assembled to said saddle clamp cylindrical rest surface 71. It can be seen that low pivot cylinder 86 is cylindrical with said rest surface.

Figure 17:
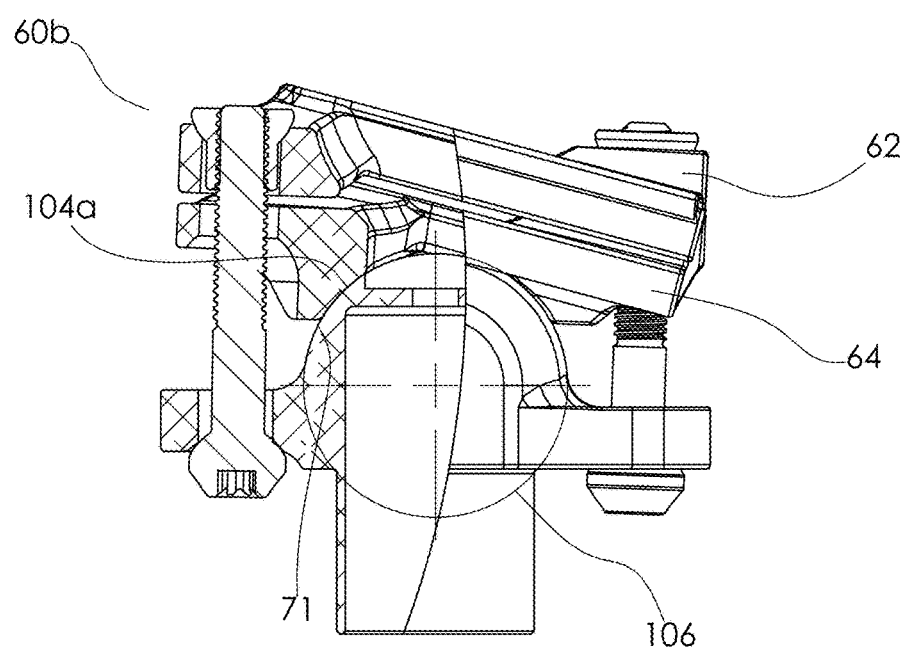
FIG. 17 is a right partial section of seatpost head assembly assembled in the high saddle configuration, including said low saddle rail plate and said high saddle rail plate according to some embodiments.

FIG. 17 is a right partial section of seatpost head assembly 60b assembled in the high saddle configuration, including said low saddle rail plate 62 and said high saddle rail plate 64 according to some embodiments. Rear high pivot cylinder surface 104a is shown assembled to said saddle clamp cylindrical rest surface 71. It can be seen that high pivot cylinder 106 is cylindrical with said rest surface.

Figure 18:
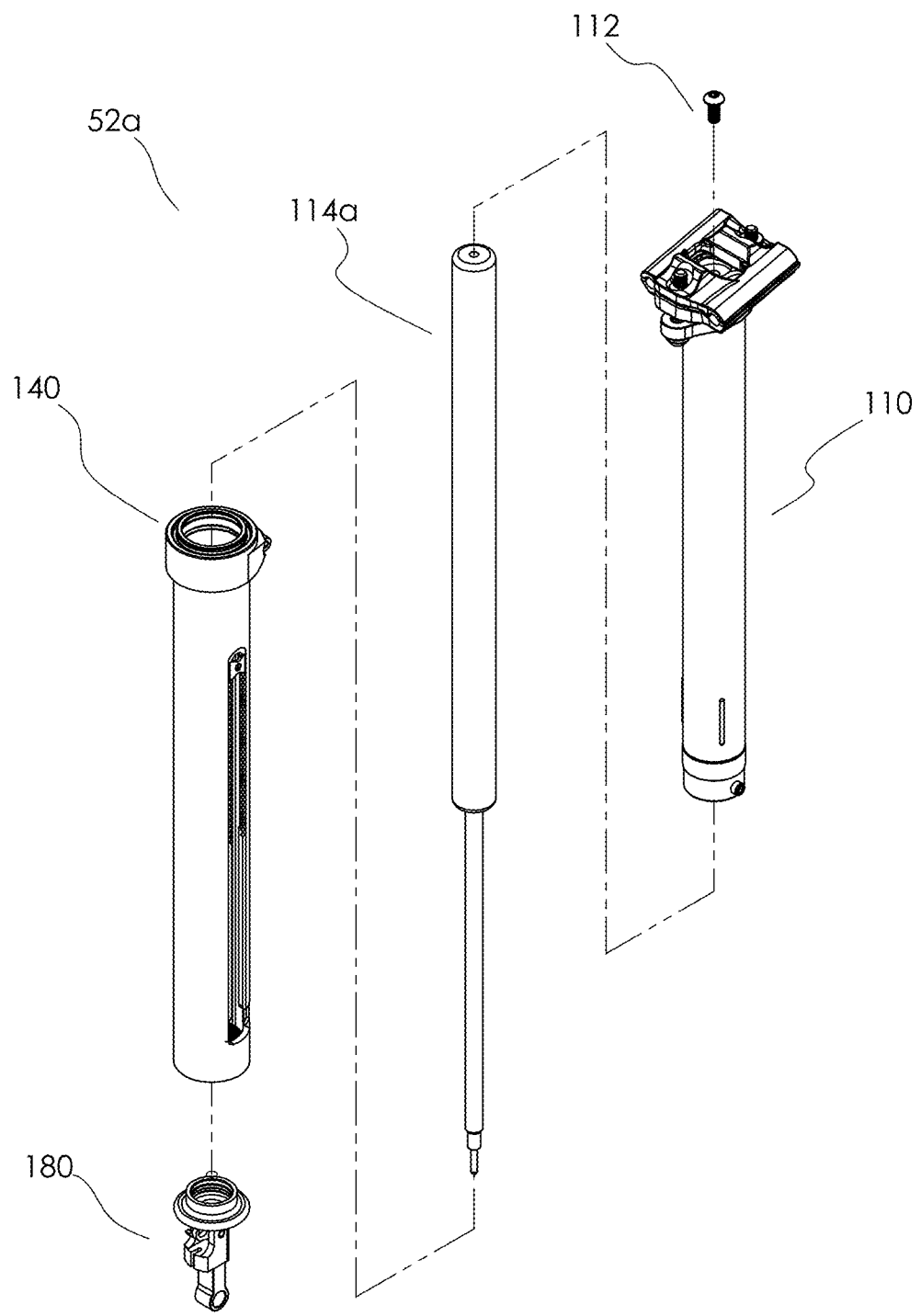
FIG. 18 is an exploded view of said adjustable seatpost assembly according to some embodiments.

FIG. 18 is an exploded view of said adjustable seatpost assembly 52a according to some embodiments. The assembly comprises a seatpost stanchion assembly 110, a seatpost gas spring screw 112, a full extension gas spring 114a, an outer tube assembly 140, a seatpost actuator assembly 180.

Figure 19:
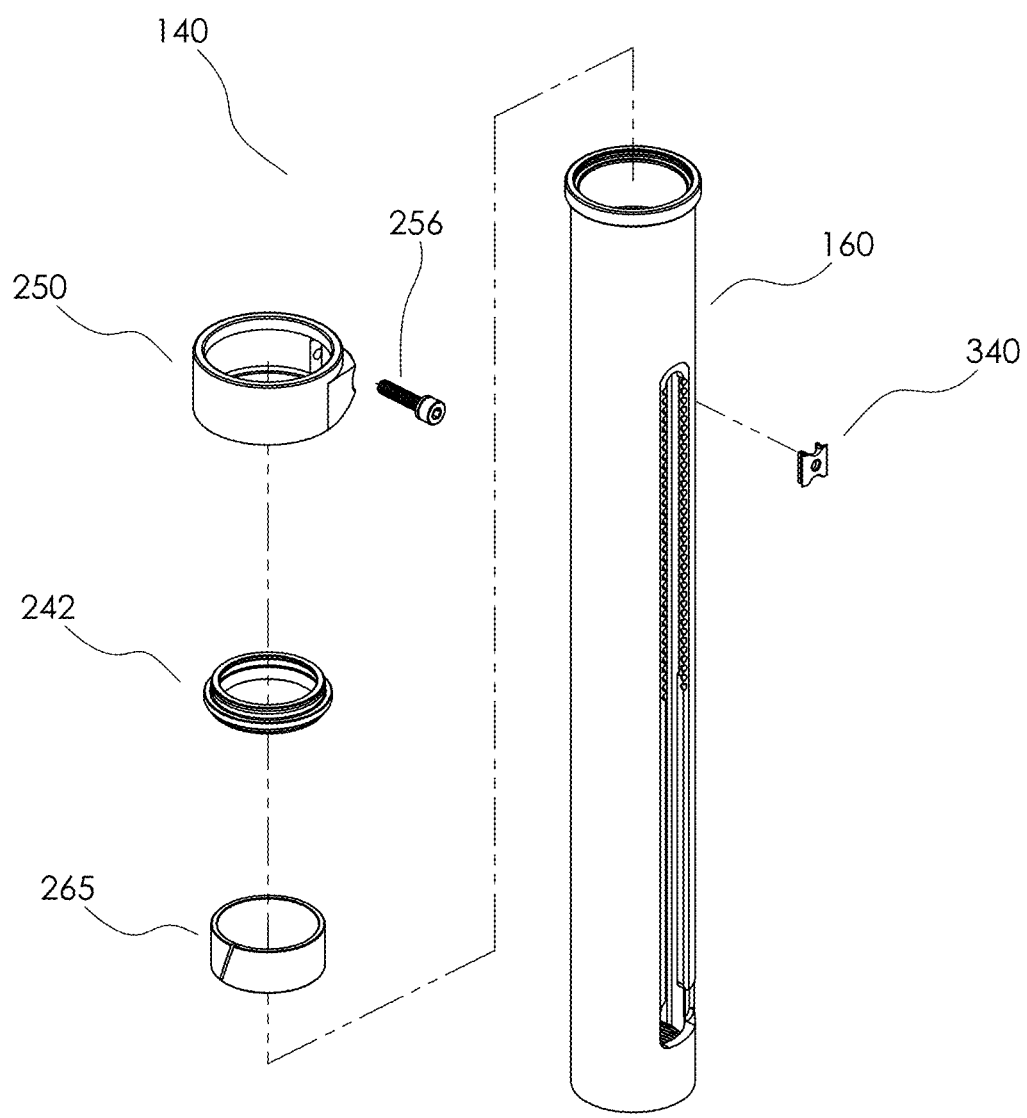
FIG. 19 is an exploded view of said outer tube assembly according to some embodiments.

FIG. 19 is an exploded view of said outer tube assembly 140 according to some embodiments. This assembly comprises a lower tube 160, a clamp collar 250, a clamp collar screw 256, a shaft seal 242, an upper bearing 265, and an extension limiter 340.

Figure 20:
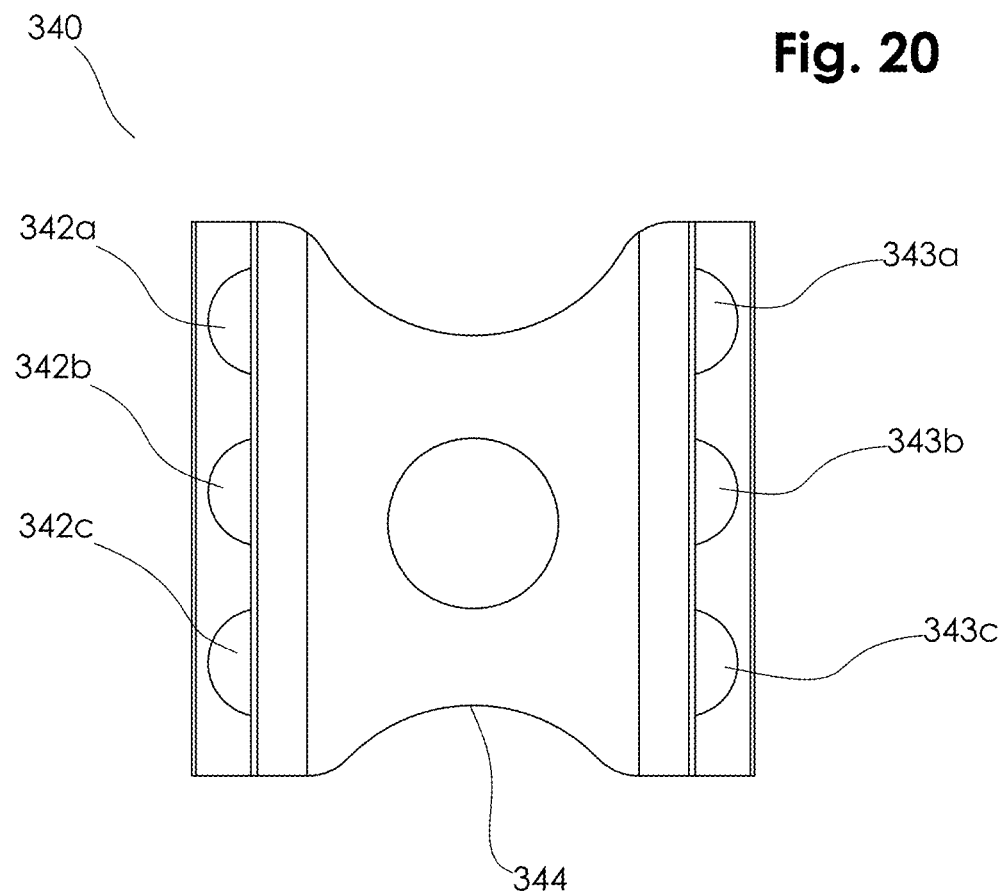
FIG. 20 shows a top right rear view of said extension limiter according to some embodiments.

FIG. 20 shows a top right rear view of said extension limiter 340 according to some embodiments. The limiter comprises an array of left limiter protrusions 342a-c and right limiter protrusions 343a-c, and travel limit seat 344.

Figure 21:
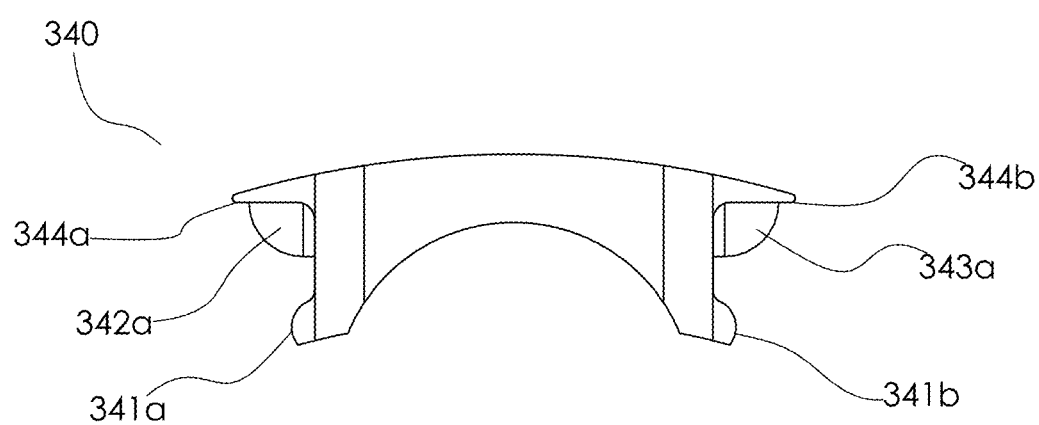
FIG. 21 shows a top view of said extension limiter, comprising left limiter snap lip and right limiter snap lip, left limiter retention lip and right limiter retention lip, and shows left limiter protrusion and right limiter protrusion from the top view according to some embodiments.

FIG. 21 shows a top view of said extension limiter 340, comprising left limiter snap lip 341a and right limiter snap lip 341b, left limiter retention lip 344a and right limiter retention lip 344b, and shows left limiter protrusion 342a and right limiter protrusion 343a from the top view according to some embodiments.

FIG. 22 shows a left view of said lower tube 160 according to some embodiments. The lower tube comprises a lower tube top surface 300, a lower tube flange outside surface 302, a tube flange seat surface 304, and a tube outside diameter 306 and a travel stop window 316. Said lower tube 160 also comprises a height adjustment slot 312, adjustment face 313 and an array of left height adjustment detents 314a and right height adjustment detents 314b.

FIG. 23 shows a right section view of said lower tube 160, which also comprises a bushing relief diameter 322, an inner bearing diameter 324, a lower cap thread 326, a right adjuster retention cutout 315b and a lower tube bottom surface 328 according to some embodiments.

Figure 24:
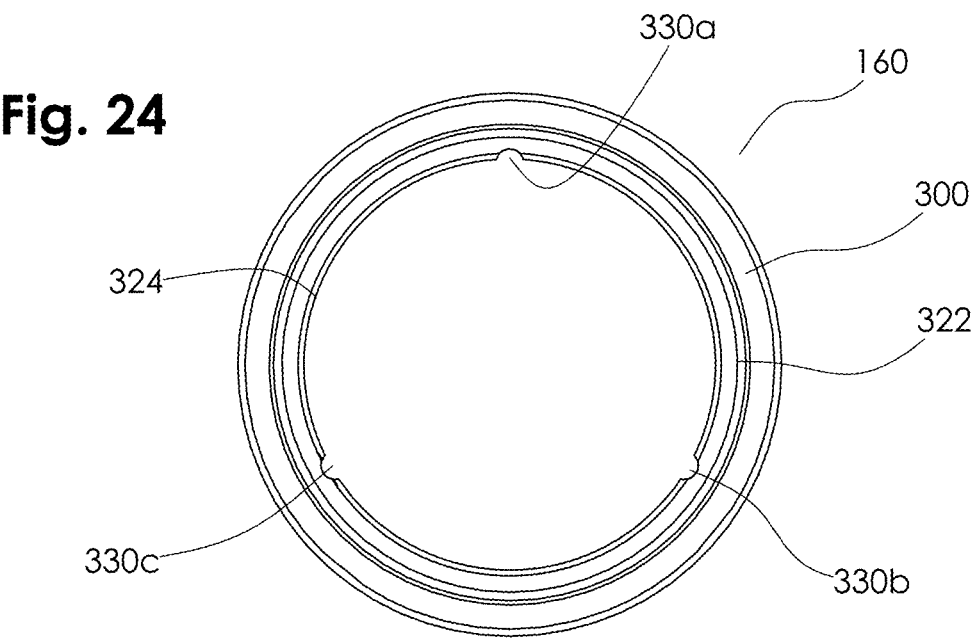
FIG. 24 shows a top view of said lower tube, comprising cylindrical key slots according to some embodiments.

FIG. 24 shows a top view of said lower tube 160, comprising cylindrical key slots 330a-c according to some embodiments. Lower tube top surface 300, bushing relief diameter 322, and inner bearing diameter 324 are also shown.

Figure 25:
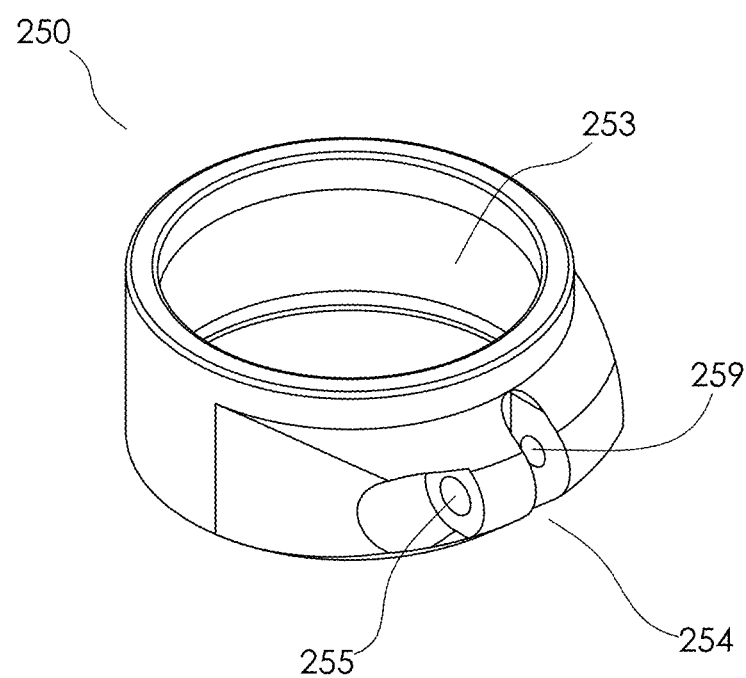
FIG. 25 shows a top front right view of said clamp collar, comprising a clamp cylindrical surface, a clamp split, and a clamp screw through hole and a clamp screw threaded hole according to some embodiments.

FIG. 25 shows a top front right view of said clamp collar 250, comprising a clamp cylindrical surface 253, a clamp split 254, and a clamp screw through hole 255 and a clamp screw threaded hole 259 according to some embodiments.

Figure 26:
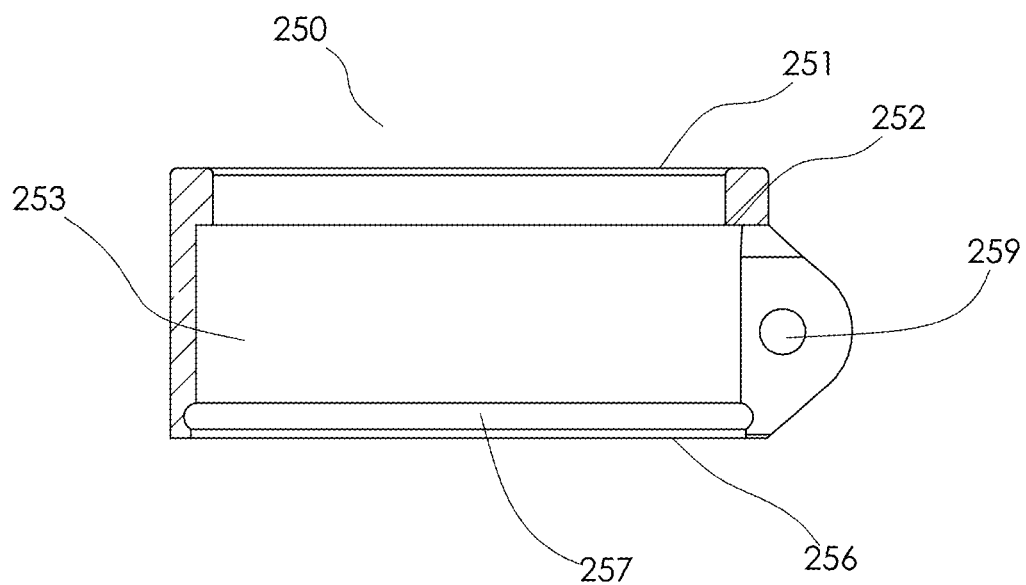
FIG. 26 shows a right cross section of said clamp collar, showing a clamp collar top surface, a collar seal seat and a clamp cylindrical surface according to some embodiments.
Figure 27:
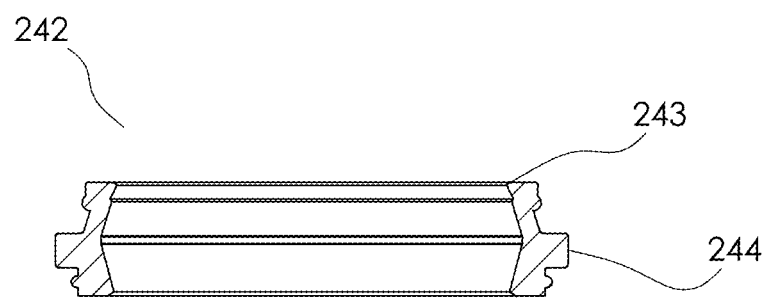
FIG. 27 shows a right section view of said shaft seal, which includes a shaft seal upper lip, and a seal outer flange according to some embodiments.

FIG. 26 shows a right cross section of said clamp collar 250, showing a clamp collar top surface 251, a collar seal seat 252 and a clamp cylindrical surface 253 according to some embodiments. Also shown are a clamp bottom surface 256 and a clamp collar gasket retaining groove 257. FIG. 27 shows a right section view of said shaft seal 242, which includes a shaft seal upper lip 243, and a seal outer flange 244 according to some embodiments.

Figures 28, 29:
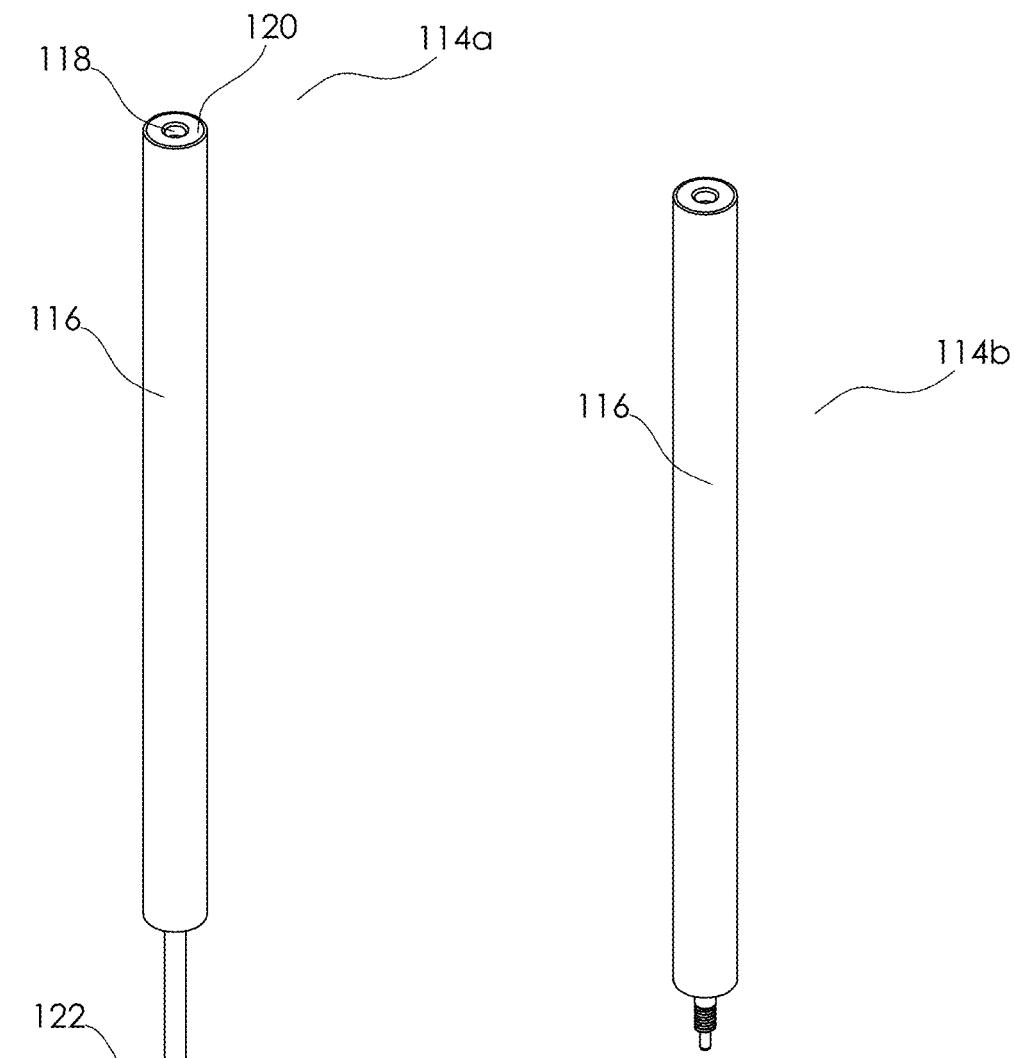
FIG. 28 is a front right isometric view of said gas spring cartridge in the fully extended condition, showing a gas spring cartridge body, a cartridge top screw hole and a cartridge top end surface according to some embodiments.
FIG. 29 shows a front isometric view of the gas spring cartridge in the fully compressed condition according to some embodiments.

FIG. 28 is a front right isometric view of said gas spring cartridge 114a in the fully extended condition, showing a gas spring cartridge body 116, a cartridge top screw hole 118 and a cartridge top end surface 120 according to some embodiments. Extending out from the bottom of the gas spring cartridge body 116 is a movable cartridge shaft 122, which comprises a cartridge shaft thread 124. Extending slidably through and protruding from the end of the cartridge shaft 122 is a cartridge unlock shaft 126, which includes an unlock shaft radiused end 128.

FIG. 29 shows a front isometric view of the gas spring cartridge 114b in the fully compressed condition according to some embodiments.

Figure 30:
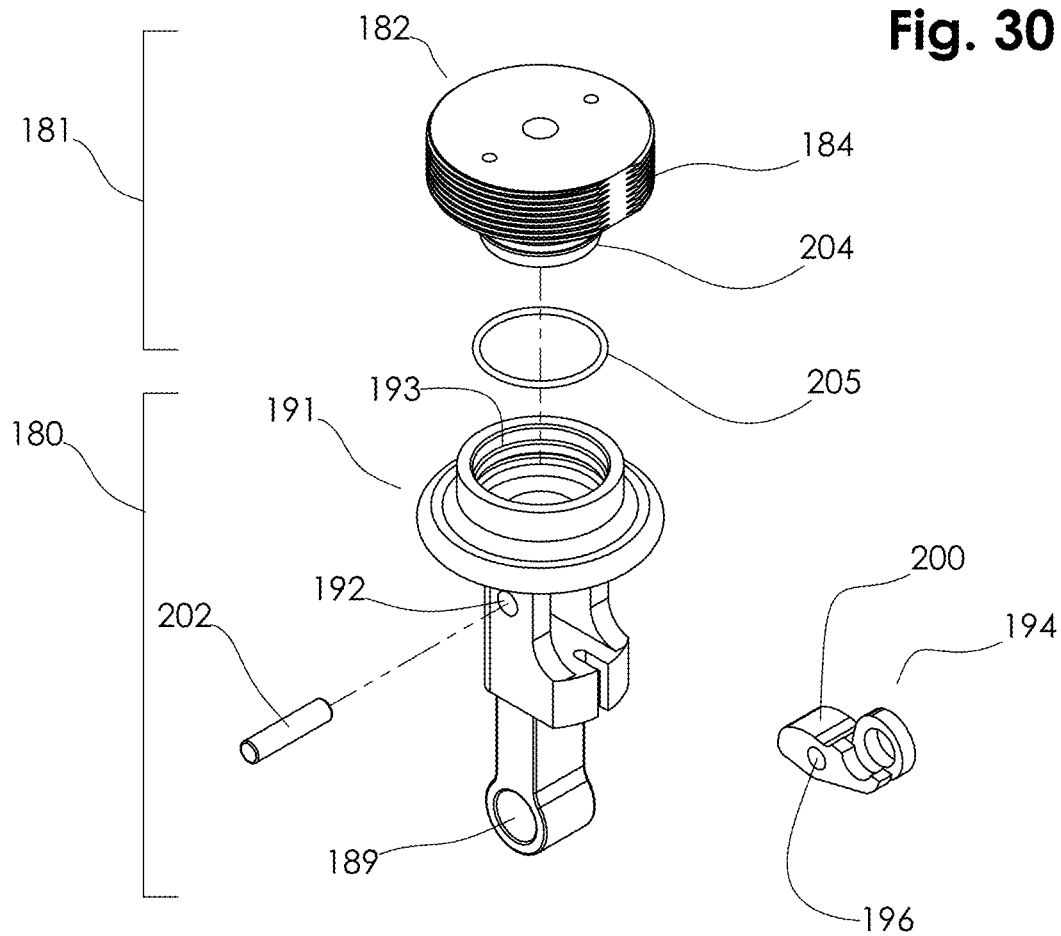
FIG. 30 shows an exploded view of said seatpost actuator assembly and a bottom cap assembly, comprising a bottom cap body, a bottom cap outer thread and a cap boss according to some embodiments.

FIG. 30 shows an exploded view of said seatpost actuator assembly 180 and a bottom cap assembly 181, comprising a bottom cap body 182, a bottom cap outer thread 184 and a cap boss 204 according to some embodiments. The assembly includes a cap o-ring 205, a cartridge actuation cam 194, which comprises a cam pivot pin hole 196, and a cam actuation surface 200. Also shown is a cam pivot pin 202, which passes through a bottom pivot pin hole 192 and said cam pivot pin hole 196. The figure also shows a disconnect cable stop 191, comprising a cap boss receptacle 193 and a frame mounting hole 189.

Figure 31:
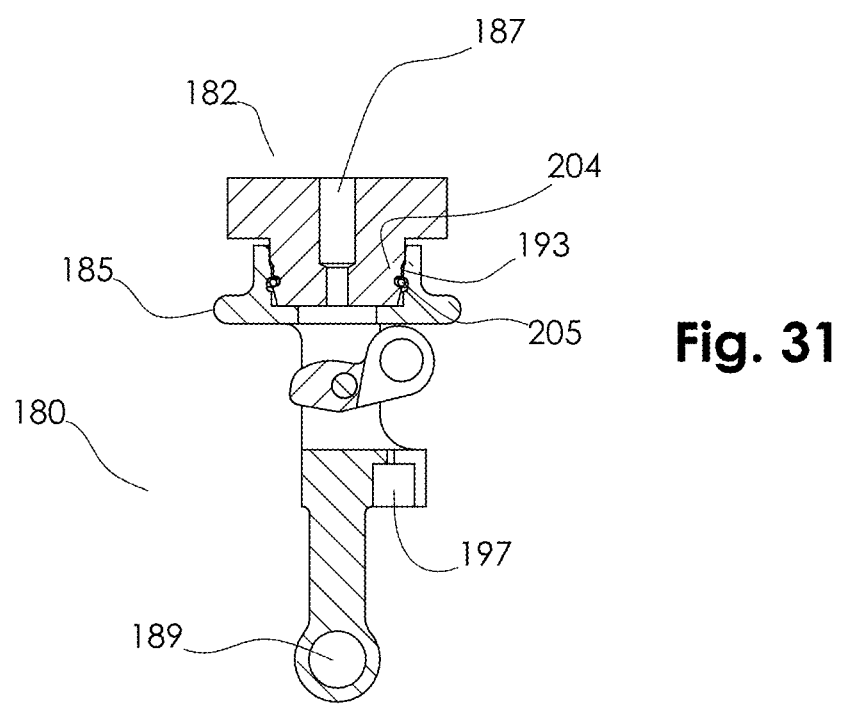
FIG. 31 shows a right section view of the bottom cap assembly in the un-exploded condition, including a bottom cap body according to some embodiments.

FIG. 31 shows a right section view of the bottom cap assembly 180 in the un-exploded condition, including a bottom cap body 182 according to some embodiments. Pictured in this view is the disconnect cable stop flange 185, bottom cap threaded hole 187, a cap outer thread stop surface 204, and an actuator cable stop hole 197. In this assembled condition the cap boss 204 is fitted into the cap boss receptacle 193, and retained by the cap o-ring 205. Frame mounting hole 189 is shown again from the side view.

Figure 32:
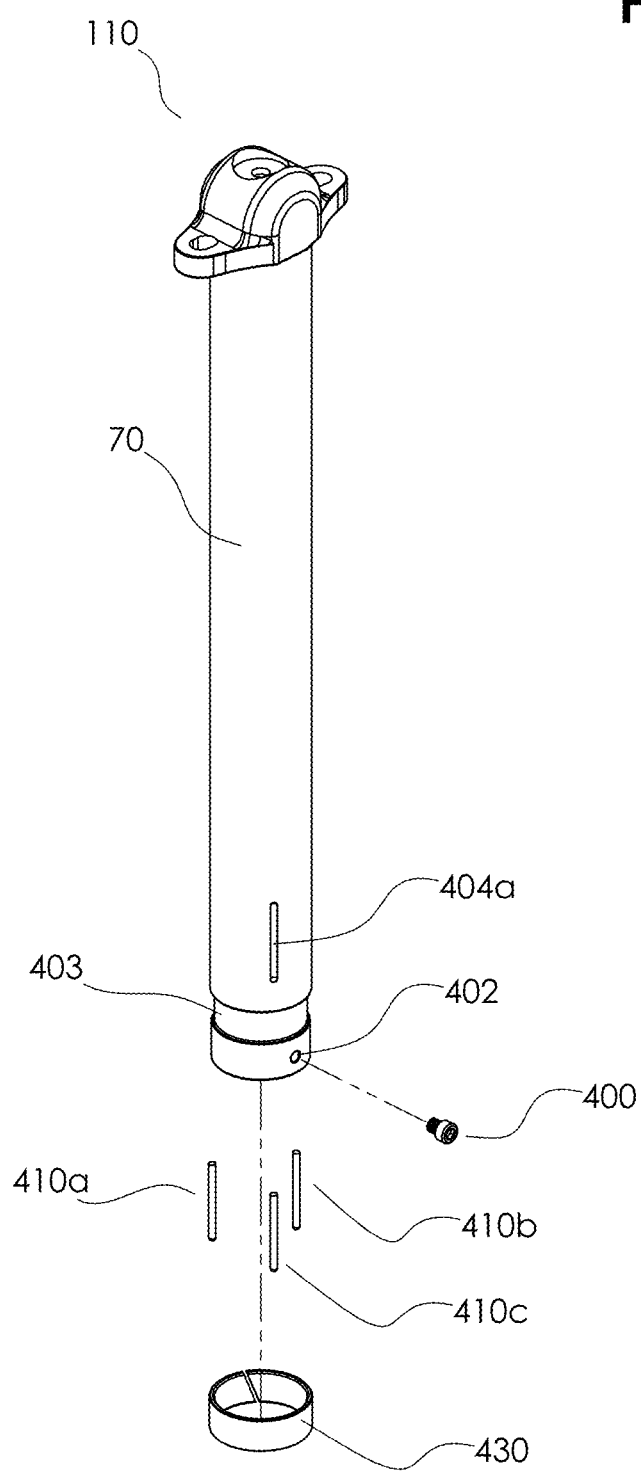
FIG. 32 is a top front right exploded view of said seatpost stanchion assembly, comprising said seatpost stanchion tube, three cylindrical keys, a seatpost stop screw, a seatpost stop screw hole, a stanchion bushing groove, a stanchion key slot, and a seatpost stanchion bushing according to some embodiments.

FIG. 32 is a top front right exploded view of said seatpost stanchion assembly 110, comprising said seatpost stanchion tube 70, three cylindrical keys 410a-c, a seatpost stop screw 400, a seatpost stop screw hole 402, a stanchion bushing groove 403, a stanchion key slot 404a, and a seatpost stanchion bushing 430 according to some embodiments.

Figure 33:
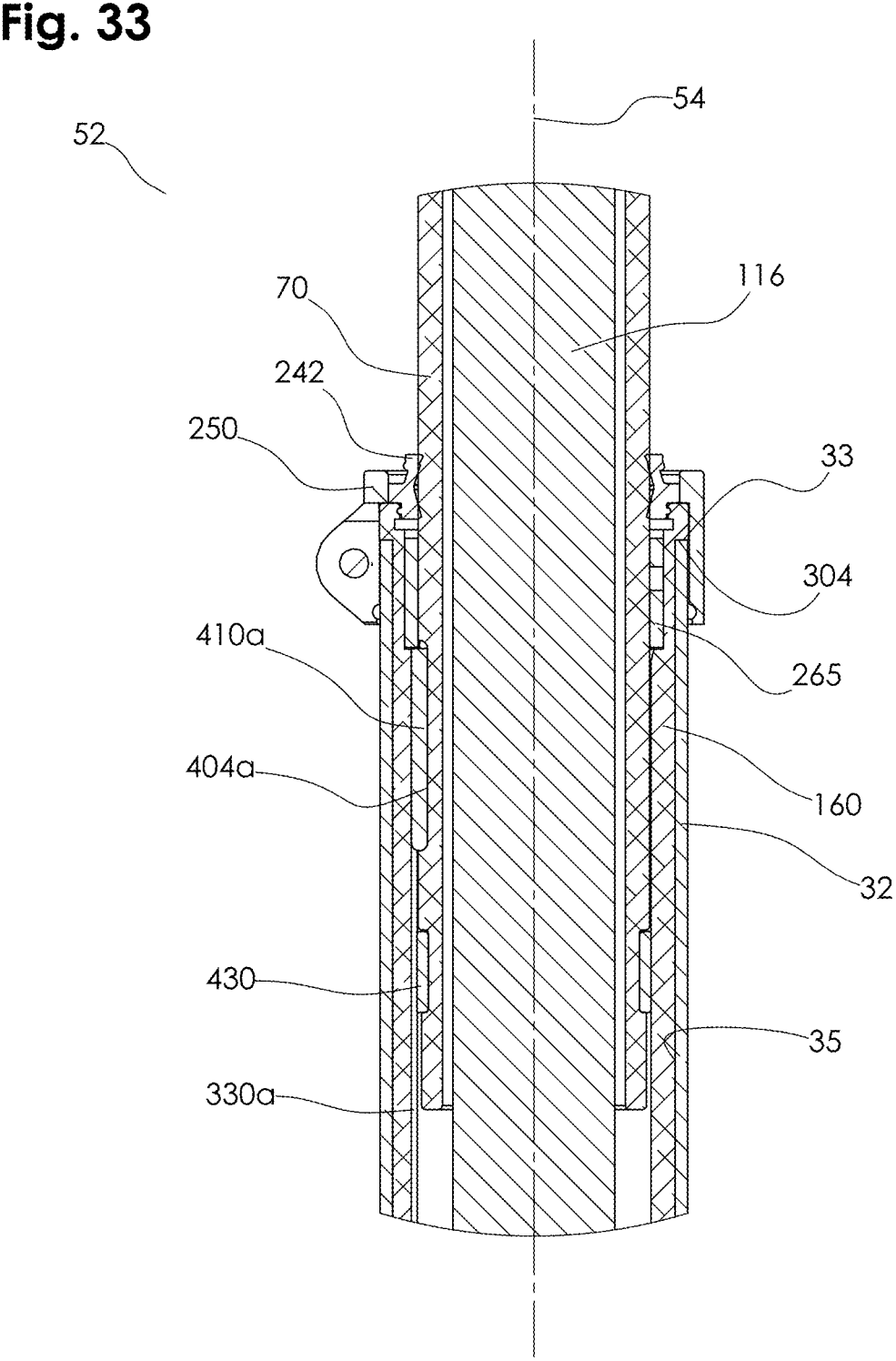
FIG. 33 is a cross sectional view of the clamp area of adjustable seatpost assembly in the fully extended condition, installed in the bicycle seat tube according to some embodiments.

FIG. 33 is a cross sectional view of the clamp area of adjustable seatpost assembly 52 in the fully extended condition, installed in the bicycle seat tube 32 according to some embodiments. Lower tube 160 is installed into seat tube inner surface 35. Visible in the cross section is gas spring cartridge body 116, passing through seatpost stanchion tube 70. Said stanchion tube fits through shaft seal 242, which is held in place by clamp collar 250. Said clamp collar is fitted around bicycle seat tube 32 and lower tube 160, clamping them together, such that tube flange seat surface 304 is pressed against seat tube top surface 33. Also pictured in the section is upper bearing 265, and cylindrical key 410a, which is fitted into stanchion key slot 404a in seatpost stanchion tube 70. Said key fits in and slides in cylindrical key slot 330a fixing the rotation of seatpost stanchion tube 70 relative to lower tube 160 about seatpost center axis 54.

Figure 34:
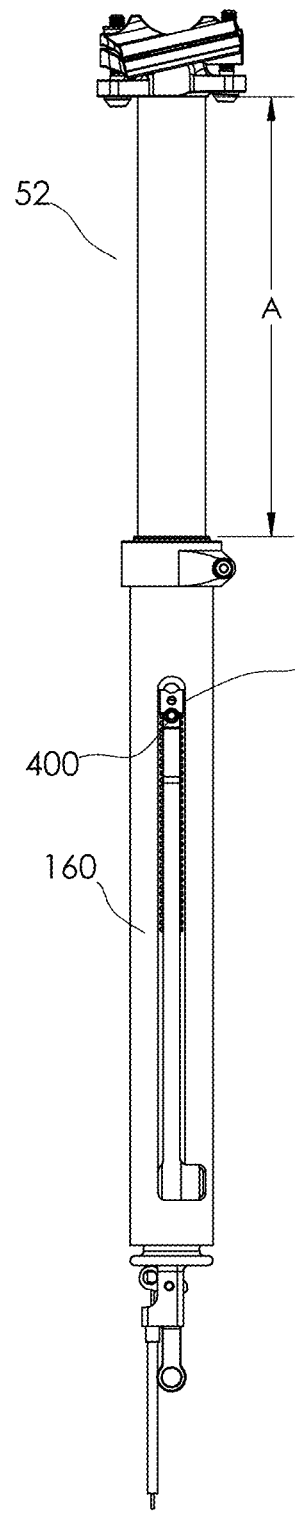
FIG. 34 shows the adjustable seatpost assembly set to maximum height A, where seatpost stop screw contacts extension limiter, and said extension limiter is fitted to its uppermost position on lower tube according to some embodiments.

FIG. 34 shows the adjustable seatpost assembly 52 set to maximum height A, where seatpost stop screw 400 contacts extension limiter 340, and said extension limiter is fitted to its uppermost position on lower tube 160 according to some embodiments.

Figure 35:
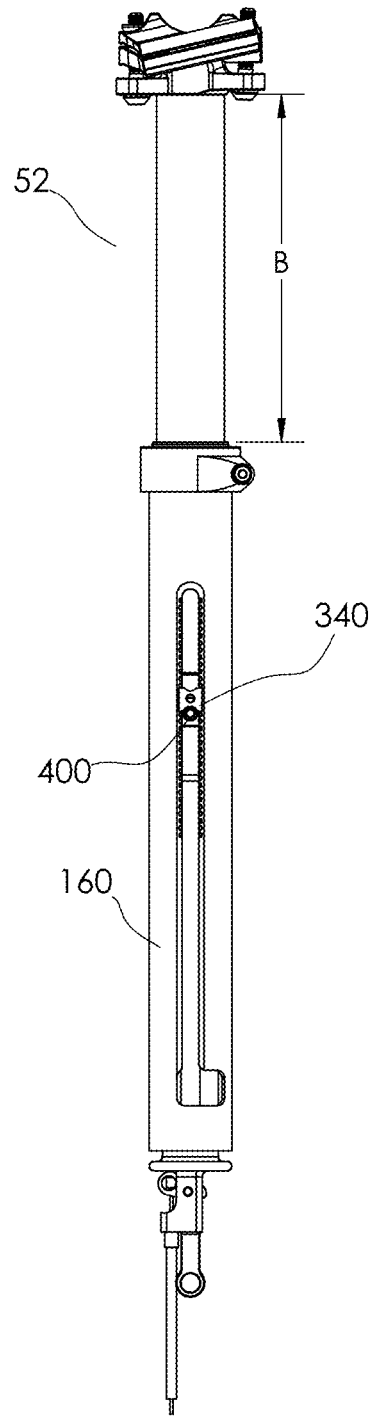
FIG. 35 shows the adjustable seatpost assembly set to an intermediate height B, using extension limiter to set the height on lower tube according to some embodiments.
Figure 36:
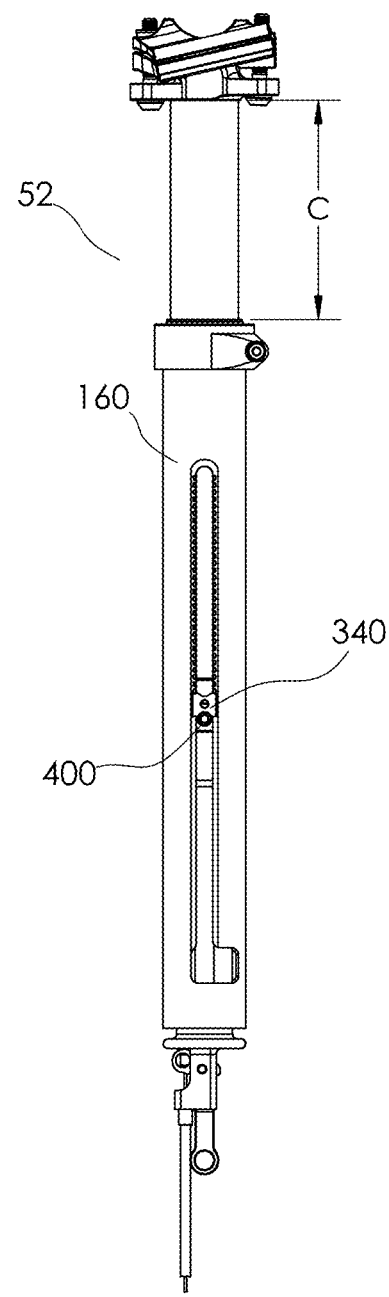
FIG. 36 shows the adjustable seatpost assembly set to minimum height C, using extension limiter to set the height, and said extension limiter is set to its lowest position on lower tube according to some embodiments.

FIG. 35 shows the adjustable seatpost assembly 52 set to an intermediate height B, using extension limiter 340 to set the height on lower tube 160 according to some embodiments. FIG. 36 shows the adjustable seatpost assembly 52 set to minimum height C, using extension limiter 340 to set the height, and said extension limiter is set to its lowest position on lower tube 160 according to some embodiments. FIG. 37 shows the adjustable seatpost assembly 52 in the fully compressed position according to some embodiments.

FIG. 38 shows the adjustable seatpost assembly 52 set to compressed height D, by installing compression stop limiter 370 to set the full compression distance, where said compression stop limiter is fitted onto cartridge shaft 122 according to some embodiments.

Figure 39:
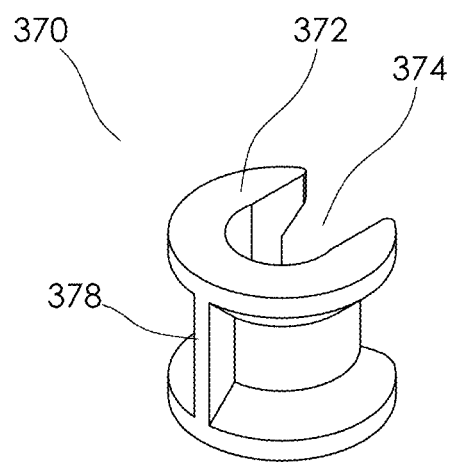
FIG. 39 is a top rear right view of said compression stop limiter, comprised of stop limiter top surface, and stop limiter slot, and stop limiter removal tab according to some embodiments.

FIG. 39 is a top rear right view of said compression stop limiter 370, comprised of stop limiter top surface 372, and stop limiter slot 374, and stop limiter removal tab 378 according to some embodiments.

Figure 40:
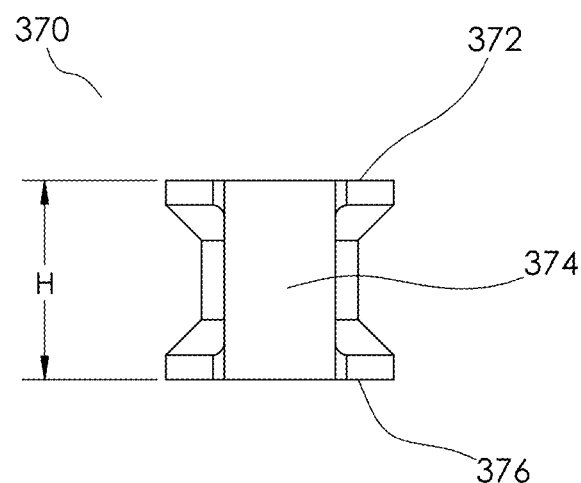
FIG. 40 shows a front view of said compression stop limiter, and shows stop limiter top surface, stop limiter slot, stop limiter bottom surface and stop limiter height H according to some embodiments.

FIG. 40 shows a front view of said compression stop limiter 370, and shows stop limiter top surface 372, stop limiter slot 374, stop limiter bottom surface 376 and stop limiter height H according to some embodiments.

Figure 41:
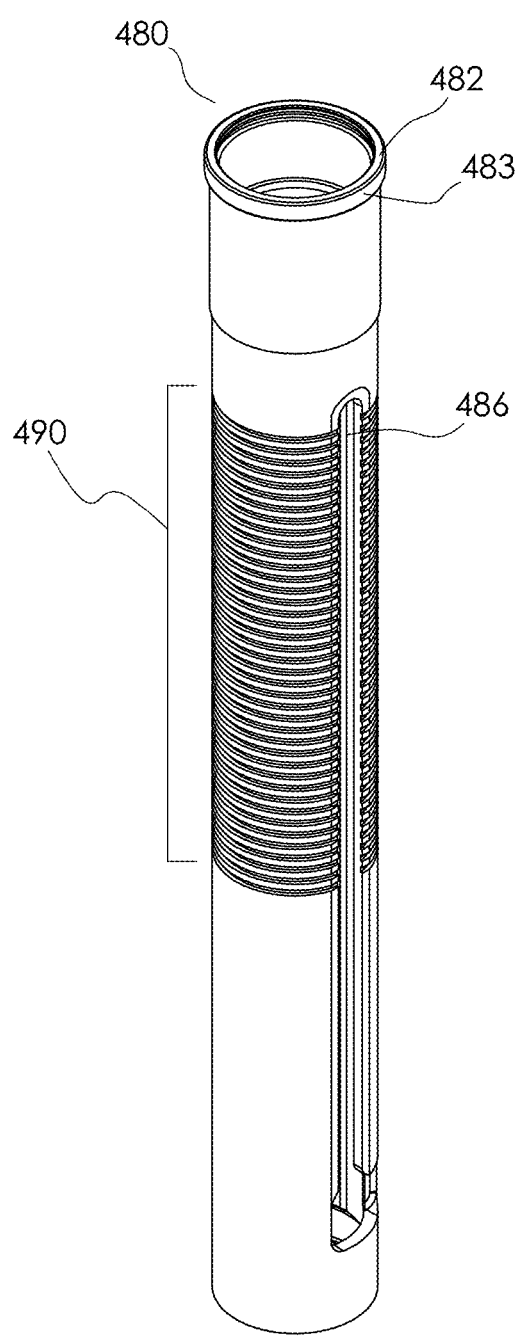
FIG. 41 shows a top front right view of a first alternative lower tube according to some embodiments.

FIG. 41 shows a top front right view of a first alternative lower tube 480 according to some embodiments. The lower tube comprises a 1a lower tube top surface 482, a 1a lower tube flange outside surface 483, an array of 1a height adjustment grooves 490, and a 1a height adjustment slot 486.

Figure 42:
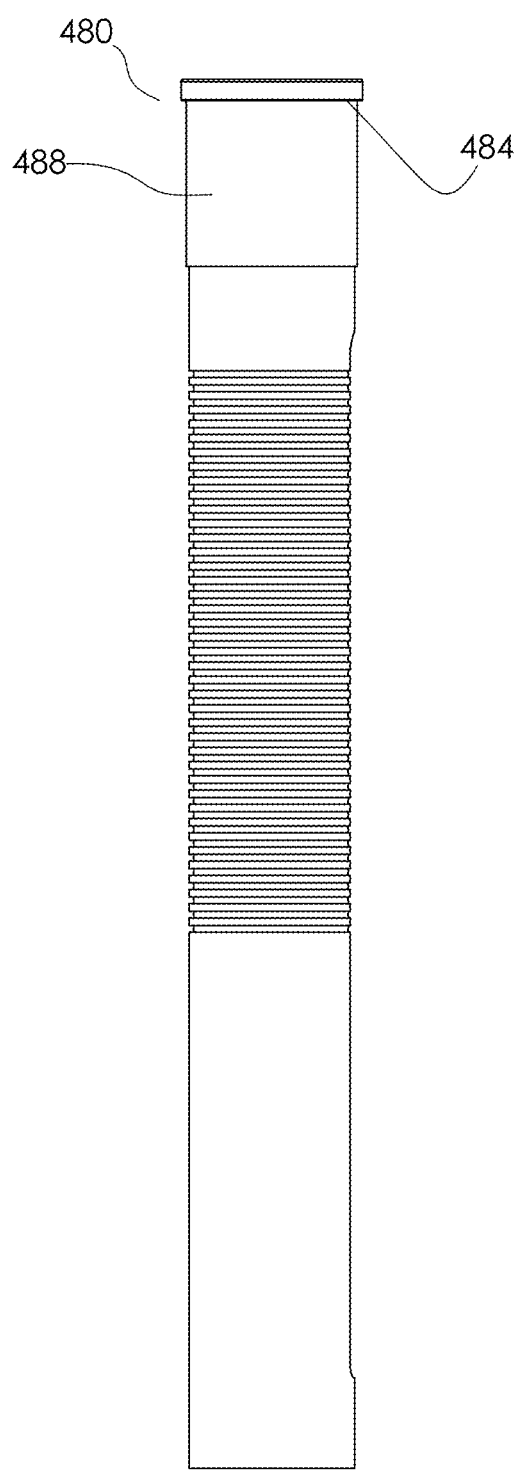
FIG. 42 shows a front view of said first alternative lower tube, showing the 1a lower tube flange bottom surface and a 1a insertion diameter according to some embodiments.

FIG. 42 shows a front view of said first alternative lower tube 480, showing the 1a lower tube flange bottom surface 484 and a 1a insertion diameter 488 according to some embodiments.

Figure 43:
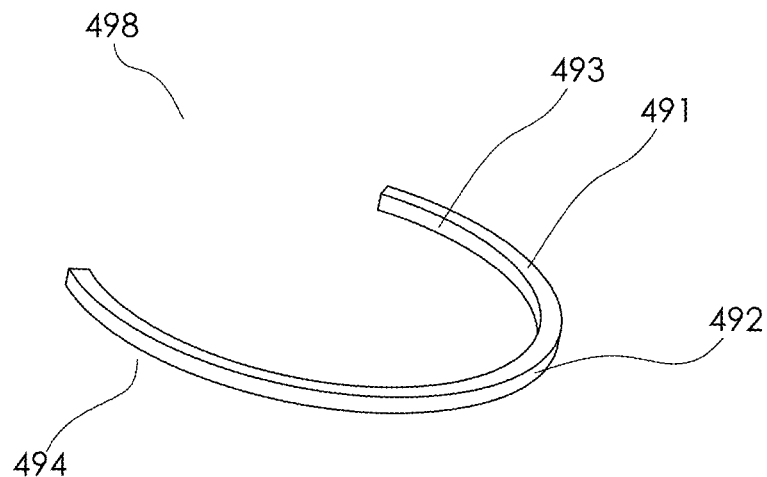
FIG. 43 shows a top front right view of a height adjustment snap ring, comprising a snap ring top surface, a snap ring outer surface, a snap ring inside surface and a snap ring bottom surface according to some embodiments.

FIG. 43 shows a top front right view of a height adjustment snap ring 498, comprising a snap ring top surface 491, a snap ring outer surface 492, a snap ring inside surface 493 and a snap ring bottom surface 494 according to some embodiments.

Figure 44:
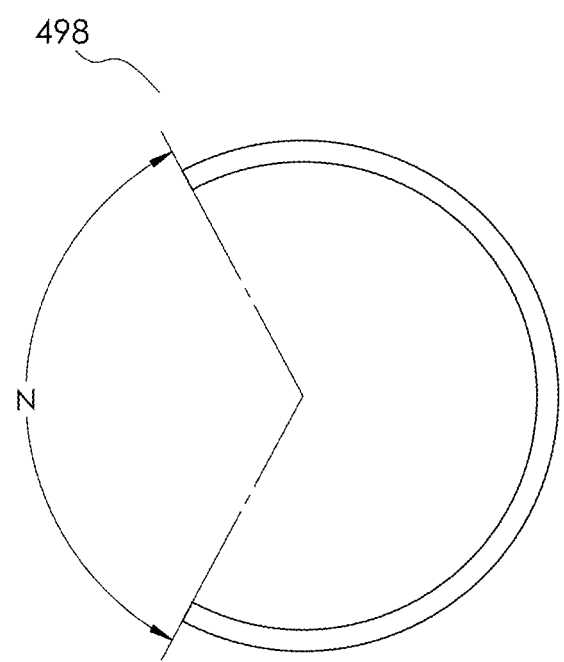
FIG. 44 shows a top view of said height adjustment snap ring, indicating a snap ring opening angle N according to some embodiments.

FIG. 44 shows a top view of said height adjustment snap ring 498, indicating a snap ring opening angle N according to some embodiments.

FIG. 45 shows a top front right view of first alternative lower tube 480 with said height adjustment snap ring 498 installed in the highest 1a height adjustment grooves 490 according to some embodiments.

FIG. 46 shows a top front right view of first alternative lower tube 480 with said height adjustment snap ring 498 installed in a middle position 1a height adjustment grooves 490 according to some embodiments.

FIG. 47 shows a top rear right view of a second alternative lower tube 500 according to some embodiments. The lower tube comprises a 2a lower tube top surface 502, a 2a lower tube flange outside surface 504, and a 2a height adjustment slot 514, and a seat tube fitment diameter 505, and a 2a lower tube center axis 516. Said second alternative lower tube 500 also comprises a 2a height adjustment groove 514, and a first array of 2a annular locking grooves 520a.

FIG. 48 shows a right side view of said second alternative lower tube 500, including a lower tube flange bottom surface 503 according to some embodiments. Also indicated are a first ring clearance 522a and a second ring clearance 522b.

Figure 49:
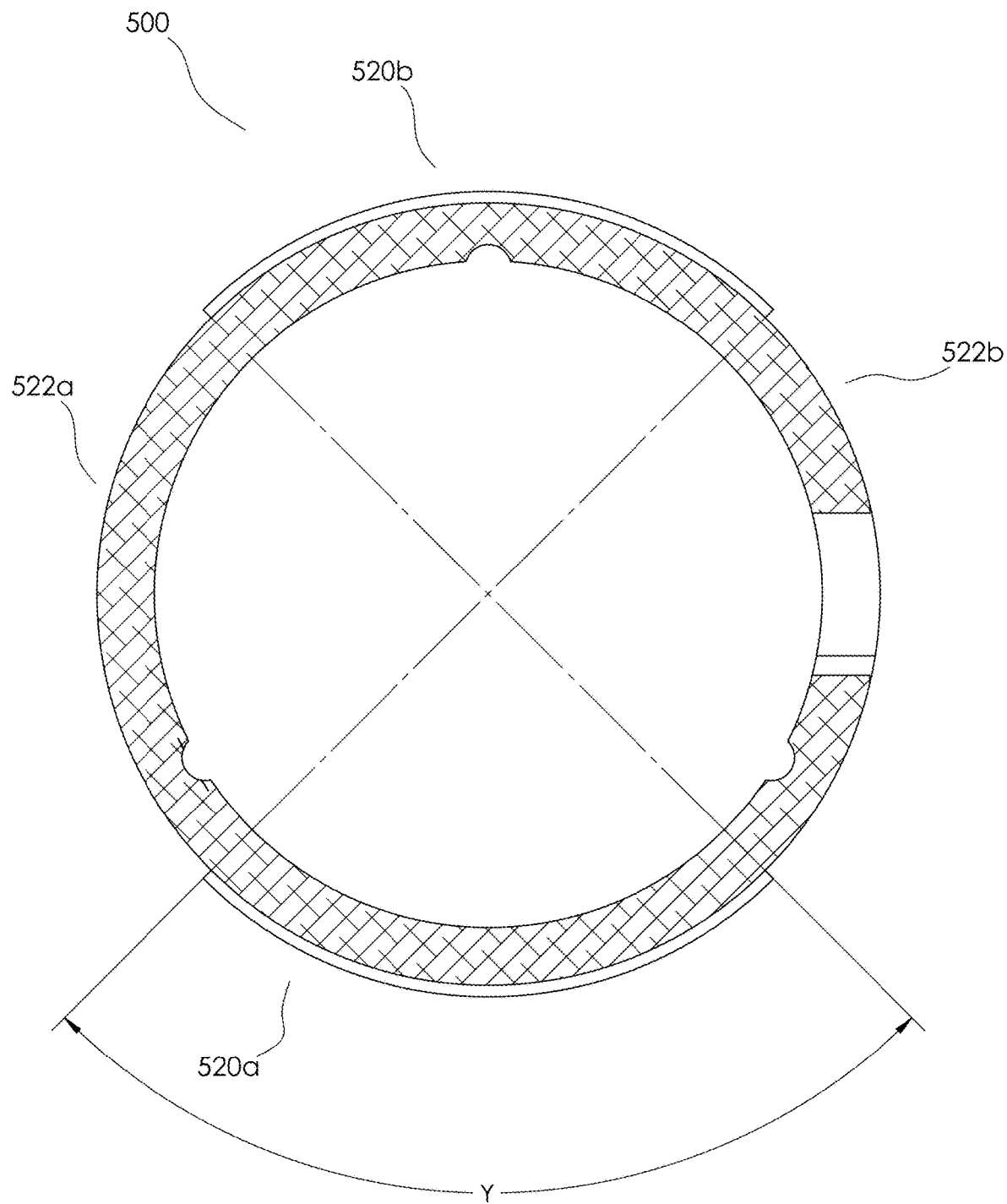
FIG. 49 shows a top section view of said second alternative lower tube, showing the top profile of 2a annular locking grooves and 2a annular locking grooves, along with first ring clearance and second ring clearance according to some embodiments.

FIG. 49 shows a top section view of said second alternative lower tube 500, showing the top profile of 2a annular locking grooves 520a and 2a annular locking grooves 520b, along with first ring clearance 522a and second ring clearance 522b according to some embodiments. Also shown is locking groove angle Y.

Figure 50:
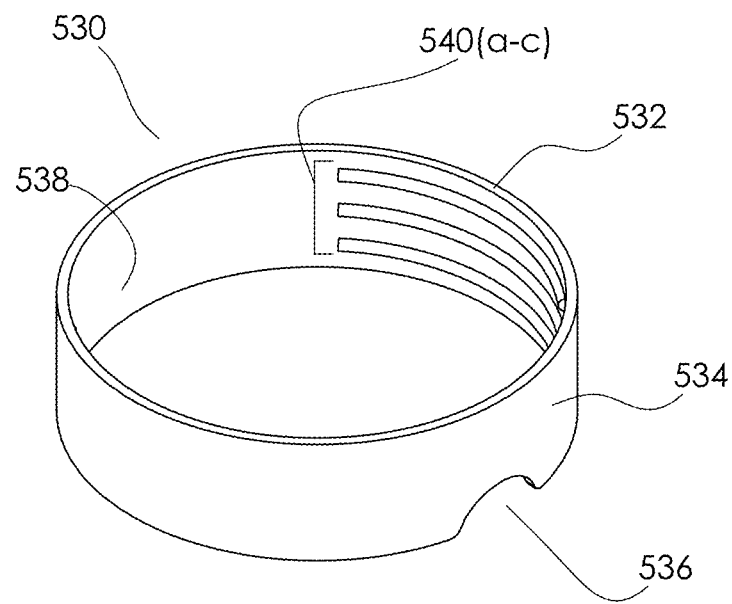
FIG. 50 shows a top rear right isometric view of a quarter turn extension limiter according to some embodiments.
Figure 51:
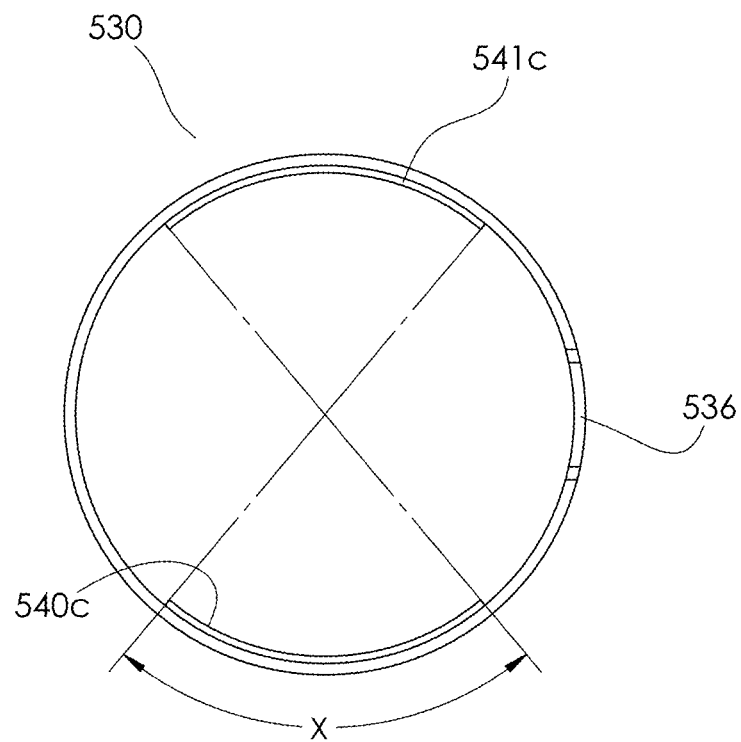
FIG. 51 shows a bottom view of said quarter turn extension limiter, showing limiter ridge angle X according to some embodiments.

FIG. 50 shows a top rear right isometric view of a quarter turn extension limiter 530 according to some embodiments. The limiter comprises a limiter top surface 532, a limiter outside surface 534, a height limit seat 536, and a limiter inside surface 538. The view also shows an array of first extension limiter ridges 540(a-c). FIG. 51 shows a bottom view of said quarter turn extension limiter 530, showing limiter ridge angle X according to some embodiments.

Figure 52:
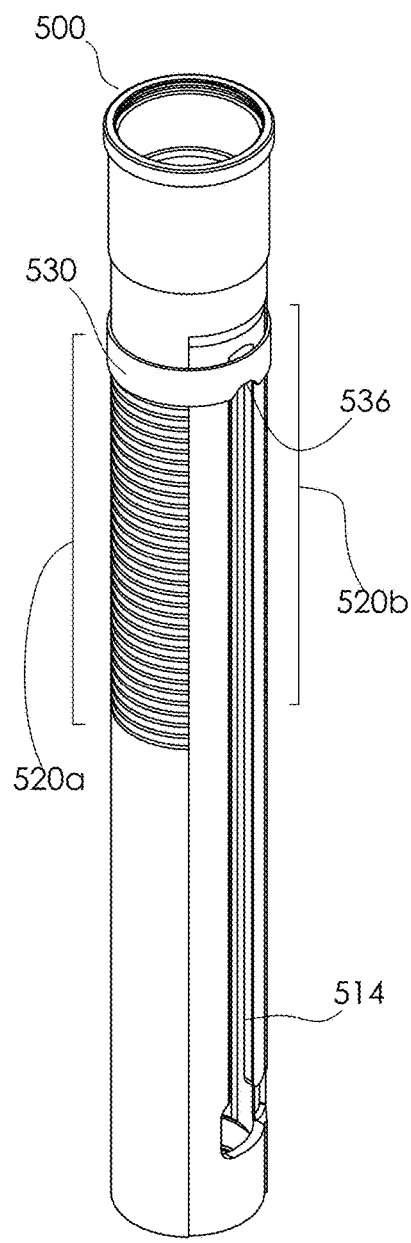
FIG. 52 shows second alternative lower tube with quarter turn extension limiter fitted in the fixed height rotational position, with height limit seat aligned with 2a height adjustment groove, such that first extension limiter ridges are engaged with 2a annular locking grooves, and second extension limiter ridges are engaged with 2a annular locking grooved according to some embodiments.

FIG. 52 shows second alternative lower tube 500 with quarter turn extension limiter 530 fitted in the fixed height rotational position, with height limit seat 536 aligned with 2a height adjustment groove 514, such that first extension limiter ridges 540(a-c) are engaged with 2a annular locking grooves 520a, and second extension limiter ridges 541(a-c) are engaged with 2a annular locking grooved 520b according to some embodiments.

Figure 53:
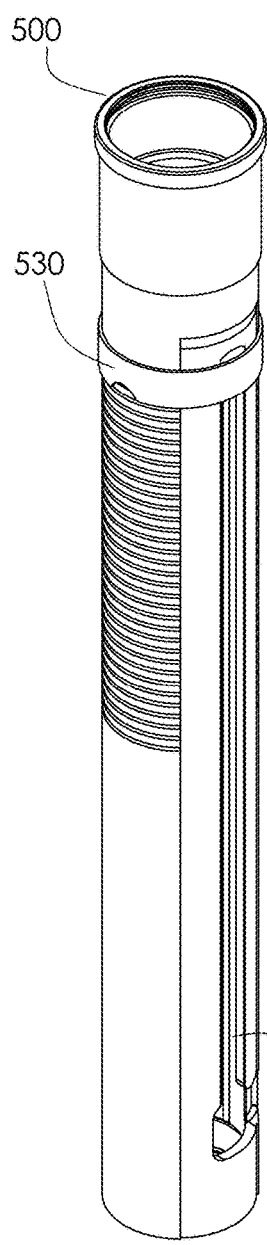
FIG. 53 shows second alternative lower tube with quarter turn extension limiter fitted in the free sliding position, rotated such that first extension limiter ridges can slide in first ring clearance and second extension limiter ridges can move freely in second ring clearance along said lower tube according to some embodiments.

FIG. 53 shows second alternative lower tube 500 with quarter turn extension limiter 530 fitted in the free sliding position, rotated such that first extension limiter ridges 540(a-c) can slide in first ring clearance 522a and second extension limiter ridges 541(a-c) can move freely in second ring clearance 522b along said lower tube according to some embodiments.

Figure 54:
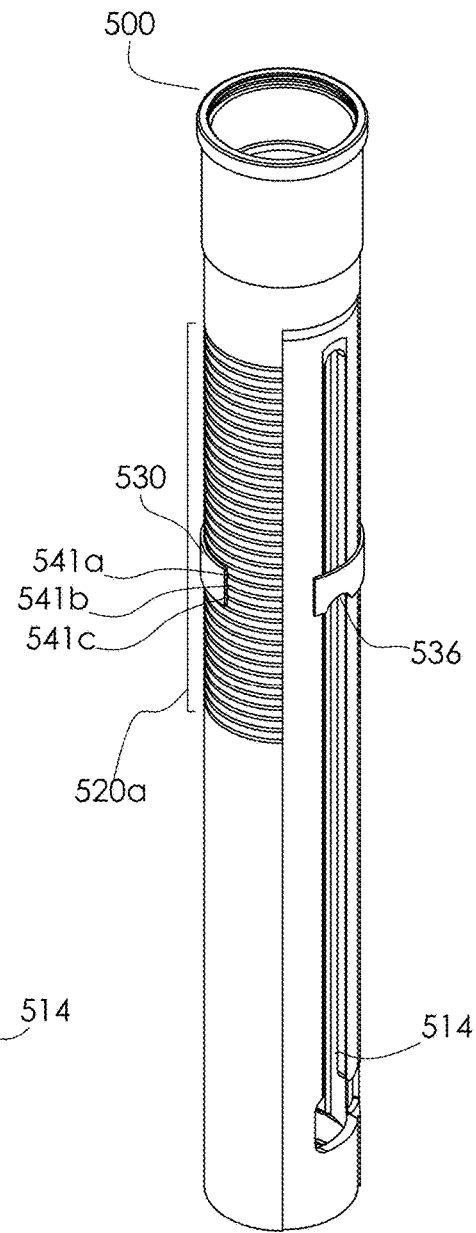
FIG. 54 shows second alternative lower tube with quarter turn extension limiter, shown in a cut-away condition, rotated into the fixed height position, so that height limit seat is once again aligned with 2a height adjustment groove, and the quarter turn extension limiter is in a new, lower position according to some embodiments.

FIG. 54 shows second alternative lower tube 500 with quarter turn extension limiter 530, shown in a cut-away condition, rotated into the fixed height position, so that height limit seat 536 is once again aligned with 2a height adjustment groove 514, and the quarter turn extension limiter is in a new, lower position according to some embodiments. Second extension limiter ridges 541(a-c) can be seen in the cross section of quarter turn extension limiter 530 engaged with 2a annular locking grooves 520a such that no vertical movement of the extension limiter is possible.

FIG. 55 shows the adjustable seatpost assembly 52 in the fully extended position as it would be configured when installed in second complete bicycle assembly 30, where the seatpost actuator assembly 180 is in the operable position, connected to the seatpost locating frame hole 41 (not pictured) according to some embodiments.

FIG. 56 shows the adjustable seatpost assembly 52 in the fully extended position as it would be configured when removed from second complete bicycle assembly 30, where the seatpost actuator assembly 180 remains in the bicycle frame, attached to the bicycle seat tube according to some embodiments.

Figure 57:
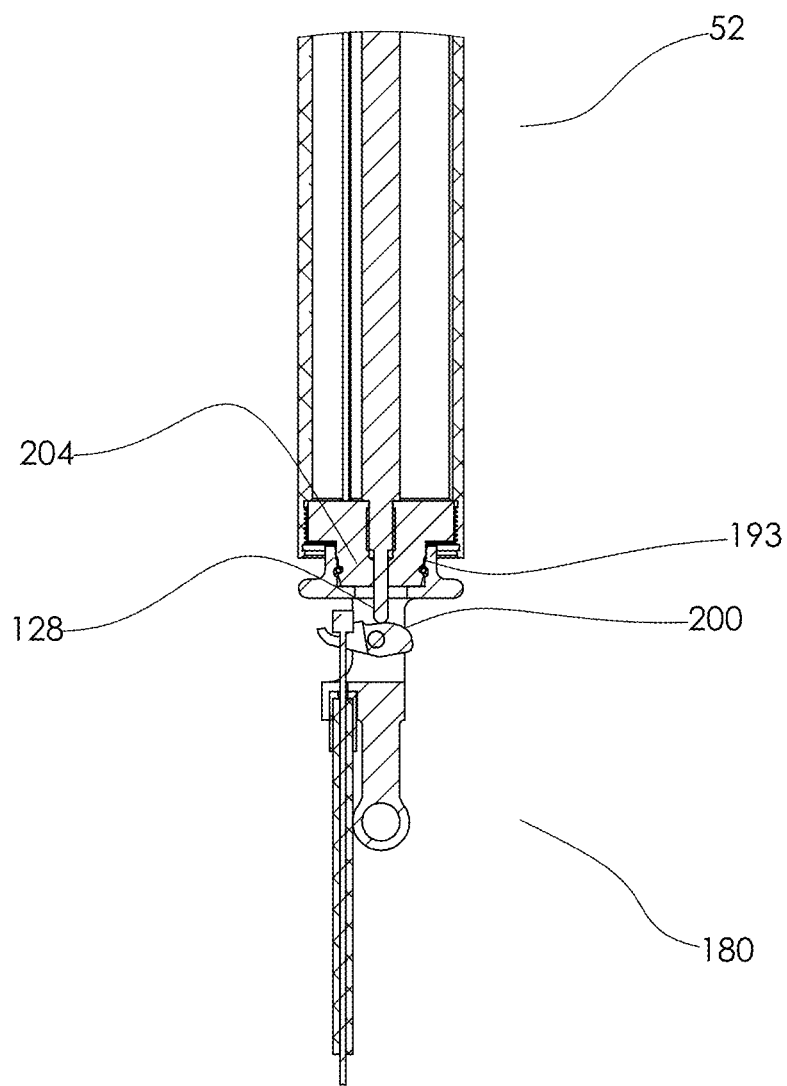
FIG. 57 is a detailed cross section view of the installed assembly of the adjustable seatpost assembly and the seatpost actuator assembly, where the cam actuation surface is in contact with the unlock shaft radiused end, and the cap boss is fitted tightly into the cap boss receptacle according to some embodiments.

FIG. 57 is a detailed cross section view of the installed assembly of the adjustable seatpost assembly 52 and the seatpost actuator assembly 180, where the cam actuation surface 200 is in contact with the unlock shaft radiused end 128, and the cap boss 204 is fitted tightly into the cap boss receptacle 193 according to some embodiments.

Figure 58:
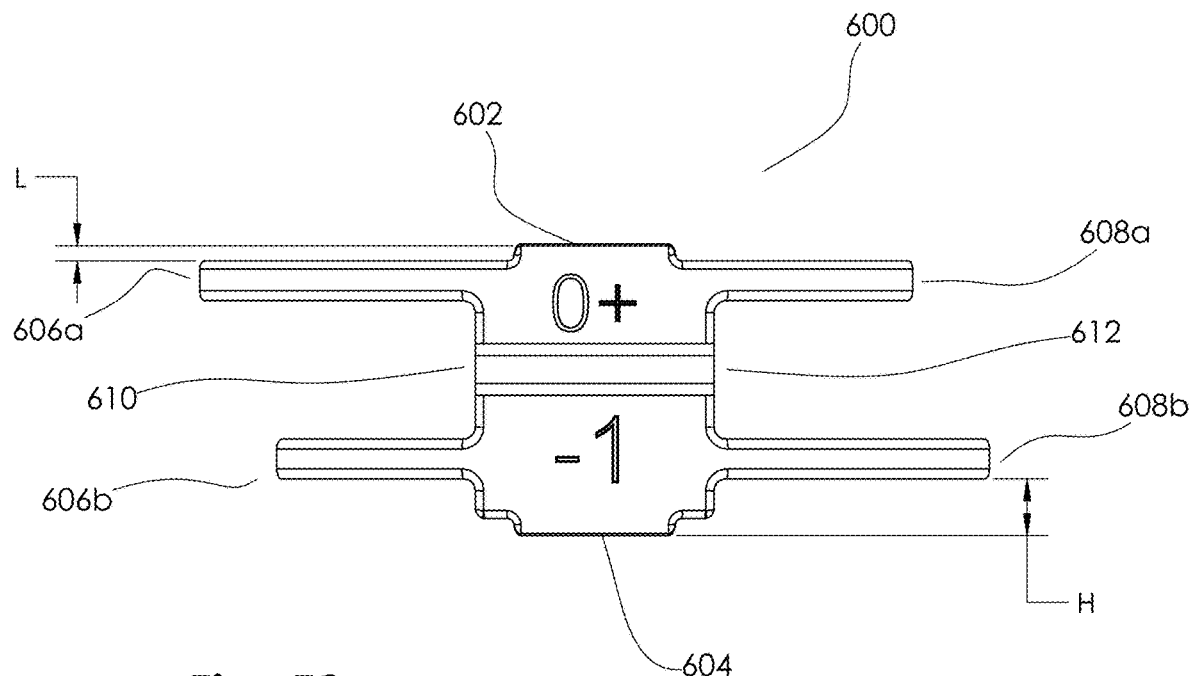
FIG. 58 shows a front view of a stop clip, comprising a zero offset stop surface, a minus one offset surface, two left clip ears and, and two right clip ears and, and a left clip side surface and a right clip side surface according to some embodiments.
Figure 59:
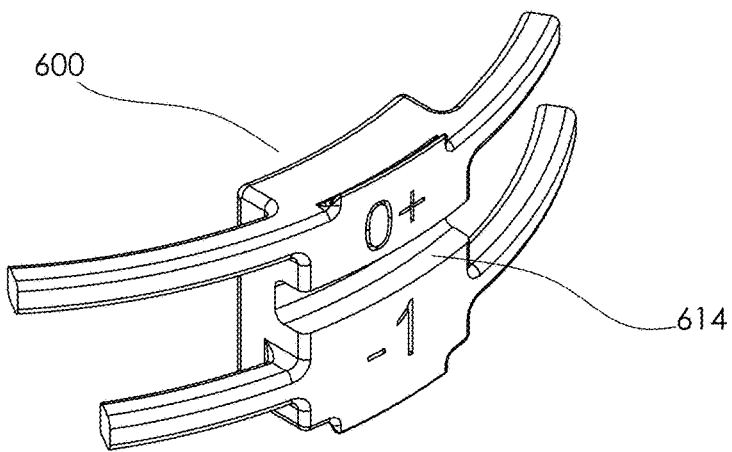
FIG. 59 is a third angle view of said stop clip, comprising a stop clip ring groove according to some embodiments.

FIG. 58 shows a front view of a stop clip 600, comprising a zero offset stop surface 602, a minus one offset surface 604, two left clip ears 606a and 606b, and two right clip ears 608a and 608b, and a left clip side surface 610 and a right clip side surface 612 according to some embodiments. FIG. 59 is a third angle view of said stop clip 600, comprising a stop clip ring groove 614 according to some embodiments.

Figure 60:
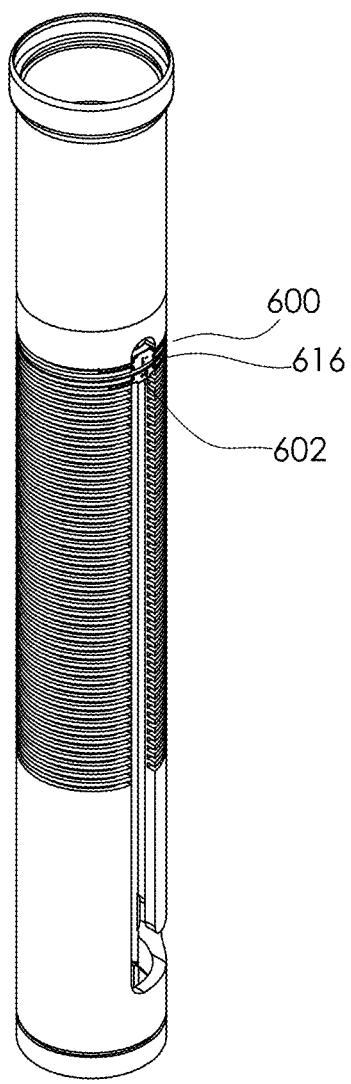
FIG. 60 shows the stop clip installed in the first alternative lower tube in the maximum extension position, with the right clip ears and the left clip ears and fitted into the height adjustment grooves, and the left clip side surface and right clip side surface fitted into the height adjustment slot according to some embodiments.

FIG. 60 shows the stop clip 600 installed in the first alternative lower tube 480 in the maximum extension position, with the right clip ears 608a and 608b and the left clip ears 606a and 606b fitted into the 1a height adjustment grooves 490, and the left clip side surface 610 and right clip side surface 612 fitted into the 1a height adjustment slot 486 according to some embodiments. A stop clip retention ring 616 is wrapped around the first alternative lower tube 480, and fits into a 1a height adjustment groove 490 and the stop clip ring groove 614.

Figure 61:
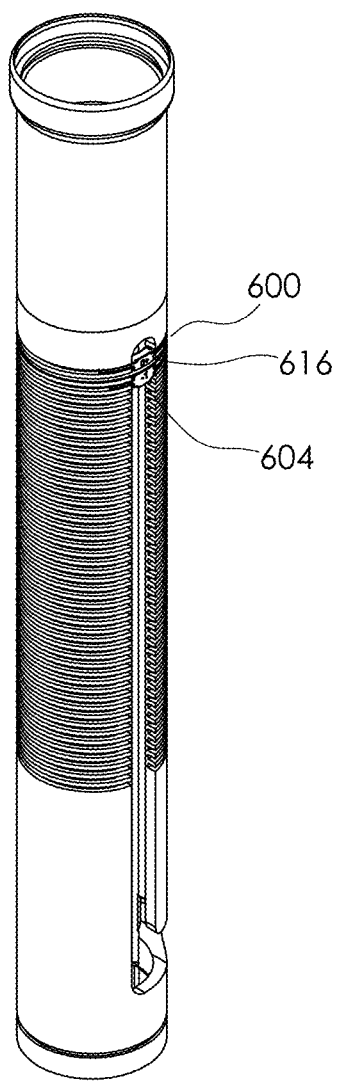
FIG. 61 shows rotating the stop clip 180 degrees such that the minus one offset surface becomes the contact surface for the seatpost stop screw, the same grooves are engaged by the ears, but the resting position of the seatpost stop screw is altered by the difference between height L and height H according to some embodiments.

In FIG. 61, rotating the stop clip 600 180 degrees such that the minus one offset surface 604 becomes the contact surface for the seatpost stop screw 400, the same grooves are engaged by the ears, but the resting position of the seatpost stop screw 400 is altered by the difference between height L and height H according to some embodiments. It can be understood that by setting the difference between L and H to equal ½ the pitch of the 1a height adjustment groove, it would be possible to add finer height adjustment to the seatpost assembly.

Figure 62:
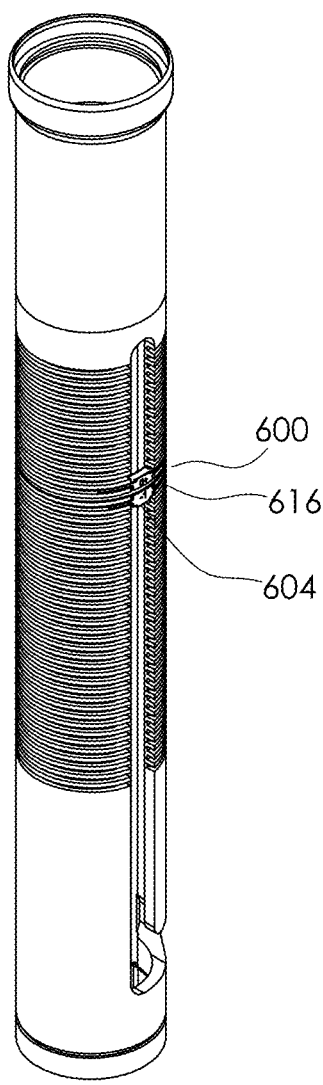
FIG. 62 shows a reduced extension configuration of the seatpost assembly, with stop clip installed in the middle area of the 1a height adjustment grooves according to some embodiments.

FIG. 62 shows a reduced extension configuration of the seatpost assembly, with stop clip 600 installed in the middle area of the 1a height adjustment grooves 490 according to some embodiments.

The embodiment described herein is assembled to a bicycle by first installing the seatpost actuator assembly 180 into the bicycle frame. A pin, screw, or other shaft is used to locate and hold the assembly in place by sliding through the seatpost locating frame hole 41 and then the frame mounting hole 189. Said actuator assembly fits inside bicycle seat tube 32, such that disconnect cable stop 191 fits into the tube, and disconnect cable stop flange 185 is radially constrained by seat tube inner surface 35.

An actuation cable assembly would be fitted to the actuator cable stop hole 197 in lieu of the dummy cable housing assembly 46, and the cable end itself would be attached to the cartridge actuation cam 194, such that actuating the cable would rotate the cartridge actuation cam 194 about the cam pivot pin 202.

Next, the complete seatpost assembly 40 slides into the bicycle seat tube 32, until the cap boss 204 slides into the cap boss receptacle 193; the cap o-ring 205 provides a friction fit between the cap and the receptacle. At the upper end of the seatpost, the tube flange seat surface 304 is pressed against seat tube top surface 33, such that the location of the seatpost in the direction of the seatpost center axis 54 is controlled by the co-location of these two features.

Once installed in the bicycle frame, the clamp collar screw 256 may be tightened in the clamp collar 250, such that a friction force is generated between the seat tube inner surface 35 and the tube outside diameter 306. This friction force prevents the seatpost from rotating and holds it in place in the bicycle.

It should be understood that the installed height of the seatpost actuator assembly 180 in the bicycle seat tube 32 is set relative to the bicycle seat tube 32 so that the cap boss 204 and the cap boss receptacle 193 are fully engaged after installation.

Gas spring cartridges such as gas spring cartridge 114*a* are commonly found in such devices as adjustable height office chairs, industrial equipment, and many other types of devices. As with any typical gas spring cartridge, the gas spring cartridge body 116 acts as a spring between the cartridge top end surface 120 and the cartridge shaft thread 124. The cartridge shaft 122 is normally locked in place, until the cartridge unlock shaft 126 is depressed into the cartridge shaft 122, at which point the gas spring cartridge 114*a* may be compressed as the cartridge shaft 122 slides into the gas spring cartridge body 116. At any point in its travel if the cartridge unlock shaft 126 is released and returned to its neutral position, the gas spring cartridge 114*a* will lock into place and resist moving in either direction, and will especially resist further compression.

To operate the seatpost and lower the bicycle saddle 16 while riding the bicycle, a rider would apply tension to the actuation cable 47 using a lever, button, or other appropriately desired mechanism. This causes the rotation of the cartridge actuation cam 194, rotating it about the cam pivot pin 202. In turn the cam actuation surface 200 presses against the unlock shaft radiused end 128, moving the cartridge unlock shaft 126 upward through the cartridge shaft 122, freeing the gas spring cartridge 114*a* to compress. Once the gas spring cartridge 114*a* is unlocked, the rider applies their body weight to the bicycle saddle 16, causing the complete seatpost assembly 40 to reduce in length, telescoping to either the fully compressed state shown in FIG. 4, or to some intermediate length of the riders choosing. Releasing tension on the actuation cable 47 allows the cartridge unlock shaft 126 to release, locking the gas spring cartridge 114*a* in place, and thereby restraining the bicycle saddle 16 in a new position.

To return the bicycle saddle 16 to its top, resting height (e.g., return the seatpost to the extended seatpost length A) the rider would remove their weight from the bicycle saddle 16, and activate once again the actuation cable 47. On activation of the cable, the gas spring cartridge 114*a* would extend to its full length, or the user could release the switch at some point during the travel to choose some intermediate height.

Based on the height and leg length of the rider, and the distance from the top of the bicycle seat tube 32, to the bicycle crank assembly 40, a preferred extended seatpost length A may be calculated such that the saddle will be positioned properly for the rider to pedal when the seatpost is at full extension. Once this preferred extended seatpost length A is known, the extended seatpost length A may be adjusted using one or more of the embodiments described herein, such that the telescoping height DT may be maximized for a given seatpost protrusion height DP.

In operation, the telescoping height DT of the complete seatpost assembly 40 is controlled by the contact between seatpost stop screw 400 and the extension limiter 340.

The location of extension limiter 340 may be set by removing it from the lower tube 160, and snapping it into one of a multitude of locations on the lower tube. The variety of locations available is controlled by the engagement of left limiter protrusions 342*a-c* and right limiter protrusions 343*a-c* in the left height adjustment detents 314*a* and right height adjustment detents 314*b* on lower tube 160.

In the pictured embodiment, the extension limiter 340 includes left limiter snap lip 341*a* and right limiter snap lip 341*b*. When the protrusions on the limiter are aligned with the detents on the tube, the limiter is snapped into place such that left limiter retention lip 344*a* and right limiter retention lip 344*b* press against the adjustment face 313, and the left limiter snap lip 341*a* and right limiter snap lip 341*b* pass through the height adjustment slot 312 and fit into and press against the inside of the left snap lip clearance 314*a* (not pictured) and right snap lip clearance 314*b*. In the pictured embodiment these features are symmetrical between left and right sets of features.

Once the extension limiter 340 has been snapped into place and these detents and protrusions are engaged, the force of gas spring cartridge 114*a* pressing on the extension limiter 340 through the seatpost stop screw 400 will not dislodge the extension limiter 340 from the set location. Additionally, the extension limiter 340 is retained in its set position by virtue of being constrained in place by seat tube inner surface 35.

To adjust the telescoping height DT, first the complete seatpost assembly 40 should be adjusted to the fully compressed position. Then clamp collar screw 256 is loosened to relieve the clamping force generated by clamp collar 250. Then the complete seatpost assembly 40 can be removed from the bicycle frame by sliding it out of bicycle seat tube 32. After removal, extension limiter 340 will be exposed, and may be removed from height adjustment slot 312, and adjusted to any of the available positions offered by the left height adjustment detents 314a and right height adjustment detents 314b on lower tube 160.

Once the new resting height is chosen, the complete seatpost assembly 40 may be reinstalled in the bicycle seat tube 32 and the clamp collar screw 256 tightened to once again fix the seatpost to the bicycle frame 42. Upon reinstallation, if the gas spring cartridge 114a is activated by the cartridge unlock shaft 126, the saddle will rise to its new maximum height, as controlled by the location of extension limiter 340.

FIGS. 34, 35 and 36 show several possible configurations of adjustable seatpost assembly 52 set to maximum heights A, B and C, respectively. It should be noted that the discrete number of heights available is controlled by the number of individual detents in left height adjustment detents 314a and right height adjustment detents 314b in combination with the number of protrusions in left limiter protrusions 342a-c and right limiter protrusions 343a-c.

Additionally, the fully compressed resting height of the adjustable seatpost assembly 52 may be set by installing one or more compression stop limiter 370 into the seatpost through travel stop window 316, as indicated in FIG. 38. As seen in this figure, compression stop limiter 370 is fitted onto cartridge shaft 122, and stop limiter slot 374 is shaped so that the compression stop limiter 370 is retained on the shaft once it is snapped into place. Compression stop limiter 370 might be made of a compliant material such as plastic to allow it to be compliant enough for easy installation and removal, while still holding it in place during operation of the bicycle and seatpost. Additionally, compression stop limiter 370 includes stop limiter removal tab 378, so that fingers or pliers are able to reach through travel stop window 316 for easy installation and removal.

As shown in the difference between FIGS. 37 and 38, after installing one compression stop limiter 370, the resting height of adjustable seatpost assembly 52 has been increased by compressed height D. It can be envisioned that any number of compression stop limiters might be stacked one on top of the other to increase the resting height according to rider preference.

Additional flexibility in the height adjustment of the seatpost assembly is added by the seatpost head assembly 60a, which incorporates a dual-height functionality by using an interchangeable set of low rail saddle plate 62 and high rail saddle plate 64.

Saddle clamp systems such as the one shown here are commonly known in the bicycle industry, as dual-rail saddles are in widespread use in all kinds of bicycle applications. With this kind of clamp, the saddle position may be adjusted fore and aft on the clamp by moving the saddle rails forwards and backwards, in, for instance, the left high saddle rail groove 92 and right high saddle rail groove 94.

Saddle tilt or angle adjustment is made by tightening and loosening saddle clamp screw 68a and 68b in concert, so that, for instance, high rail saddle plate 64 rotates about high pivot cylinder axis 108.

As demonstrated in FIGS. 14 and 15, an additional height adjustment can be added to the seat post assembly by choosing to place either the low rail saddle plate 62 or high rail saddle plate 64 in the bottom-most position of the assembly, in contact with the saddle clamp cylindrical rest surface 71. Then the second, remaining plate is used for the topmost clamp on the saddle rails. For instance, if the high rail saddle plate 64 is used on the bottom part of the clamp in contact with saddle clamp cylindrical rest surface 71, as pictured in FIG. 17, then low rail saddle plate 62 forms the upper part of the clamp.

The difference in resting height between these two configurations would be determined by subtracting low saddle support distance HL from high saddle support distance HH. This adjustment does not affect the overall travel of the seatpost which is controlled by other means described in this application. However, it would mean that potentially fewer lengths of seatpost need to be offered to customers in order to accommodate the largest possible number of riders and bicycle frame sizes.

Many alternative embodiments might be envisioned, employing the same concept of a stop limiter being adjustably moved on an outer tube, where the stop feature on the stanchion tube is accessed via a slot in the outer tube.

One alternative embodiment uses first alternative lower tube 480 and its array of 1a height adjustment grooves 490. Rather than an extension stop limiter, a height adjustment snap ring 498 is removably fitted to the first alternative lower tube 480, such that the seatpost stop screw 400 is stopped in its upward motion when it comes into contact with the snap ring, thereby controlling the extended height of the seatpost. The snap ring could be adjusted using a similar procedure to the compression stop limiter 370 in the first embodiment.

One helpful feature of this embodiment is that the height adjustment snap ring 498 and the 1a height adjustment grooves 490 may be sized such that the ring is retained in the groove by contact between the snap ring outer surface 492 and the seat tube inner surface 35. This will keep the snap ring from moving from its set position once the seatpost is installed in the bicycle.

A second alternative embodiment would use a second alternative lower tube 500 with a quarter turn extension limiter 530 as the height control for the seatpost.

A demonstration of the operation of this embodiment is shown in FIGS. 52, 53 and 53. FIG. 53 shows the quarter turn extension limiter 530 rotated such that first extension limiter ridges 540(a-c) can slide in first ring clearance 522a and second extension limiter ridges 541(a-c) can move freely in second ring clearance 522b along the length of said lower tube.

In this way, the quarter turn extension limiter 530 may be moved to a location along the lower tube according to the user's preference. Once the preferred location is set, the quarter turn extension limiter 530 is rotate 90 degrees such that height limit seat 536 is aligned with 2a height adjustment groove 514, and first extension limiter ridges 540(a-c) are engaged with 2a annular locking grooves 520a, and second extension limiter ridges 541(a-c) are engaged with 2a annular locking grooved 520b.

This orientation stops the motion of quarter turn extension limiter 530, and sets the maximum height of the seatpost assembly when seatpost stop screw 400 contacts the height limit seat 536.

In addition to these alternative embodiments, many other variations are possible, using the same basic convention of a stop feature contacting an adjustable height adjustment feature. For instance, rather than seatpost stop screw 400, any number of other stop-features could be envisioned, such as a rivet, a pin pressed into a hole, a boss machined onto the seatpost stanchion tube 70. Alternatively, the stop feature could be incorporated into a seatpost stanchion bushing 430, either by drilling a hole in the bushing, or molding or machining the protruding shape into the bushing itself, so that a monolithic part is formed with a boss or protuberance taking the place of the seatpost stop screw 400.

Another alternative would be to include an inward facing boss or feature on the external extension limiter, such that the feature extends into a groove or slot cut into the seatpost stanchion tube 70. This could allow this alternative feature to index height by contacting the seatpost stanchion bushing 430, precluding the need for the additional seatpost stop screw 400 or an analogous replacement feature separate from the stanchion.

Another alternative would be to replace the 1a height adjustment grooves 490 on first alternative lower tube 480 with a helical machine thread, or possibly a square or acme type thread, combined with an internally threaded ring similar to quarter turn extension limiter 530. In this embodiment, the threaded height adjustment ring could be threaded onto the bottom of the outer tube, and detents similar to the height limit seat 536 on quarter turn extension limiter 530 would provide resting positions for a seatpost stop crew 400 or other stop feature. These alternative seats would help ensure that the alternative threaded height adjustment does not rotate while the post is in operation, by generating a centering force between the alternative seat and the alternative height stop feature.

Another alternative embodiment could be envisioned, where ridges similar to those found on the outside of second alternative lower tube 500 are included on the exterior surface of a gas spring similar to gas spring cartridge 114*a*. In this alternative a quarter turn adjusting sleeve would fit inside a stanchion tube similar to seatpost stanchion tube 70. In this alternative the adjusting sleeve would include a lever protruding from the top of the alternative stanchion, such that the sleeve could be rotated 90 degrees to engage and disengage said alternative ridges from said alternative sleeve, and the top end of the alternate gas spring would not be attached to the stanchion of the post by a screw. In this alternative, some adjustment could be made to the resting height of the post by rotating the lever to disengage the ridges from the sleeve, then adjusting the height of the stanchion tube relative to the gas spring, then moving the lever back to the locked position to lock the vertical position of the gas spring to the alternative stanchion tube.

Another alternative embodiment is depicted in FIGS. 60, 61 and 62, where a stop clip 600 is installed in 1a height adjustment slot 486 in various positions and orientations on a first alternative lower tube 480, to provide an adjustment to the maximum extension of the seatpost. After fitting the stop clip 600, an elastic stop clip retention ring 616 can be installed on the outer tube to hold the stop clip 600 in place. This ring could be an elastic rubber o-ring, or a steel snap ring, or a circular coil spring, or any other commonly used elastic ring.

In FIG. 60, said stop clip 600 is fitted to the 1a height adjustment slot 486 such that zero offset stop surface 602 is facing down, and would be the contact surface for the seatpost stop screw 400, when the seatpost is extended.

It should be apparent that any of the grooves in the 1a height adjustment grooves 490 can be used to set the maximum extension height of the seatpost.

In operation, once the actuating cable in the bicycle has been routed and connected to the actuator, the seatpost is able to be removed and a maximum extension length adjusted by simply loosening the top clamp, pulling the post out, adjusting then replacing the assembly in the bike frame. The actuator assembly stays installed in the bicycle the entire time.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed:

1. A telescopic bicycle seatpost comprising:
   an adjustable seatpost assembly including:
      a tube configured for adjusting a maximum extension length;
      a maximum extension limiter that when locked to the tube sets the maximum extension length of the adjustable seatpost assembly while enabling the adjustable seatpost assembly to be extended to lengths less than the maximum extension length; and
      a gas spring cartridge configured for raising and lowering a seat; and
   a seatpost actuator assembly configured to receive the adjustable seatpost assembly, wherein the seatpost actuator assembly is configured to remain installed in a bicycle when the adjustable seatpost assembly is removed.

2. The telescopic bicycle seatpost of claim 1 wherein the tube comprises a plurality of height adjustment grooves.

3. The telescopic bicycle seatpost of claim 2 wherein the maximum extension limiter comprises a stop clip.

4. The telescopic bicycle seatpost of claim 1 wherein the tube comprises a helical machine thread.

5. The telescopic bicycle seatpost of claim 1 wherein the tube comprises a square thread.

6. The telescopic bicycle seatpost of claim 1 further comprising an actuating cable coupled to the seatpost actuator assembly.

7. The telescopic bicycle seatpost of claim 1 wherein a cap boss of the adjustable seatpost assembly is configured to fit into a cap boss receptacle of the seatpost actuator assembly.

8. A telescopic bicycle seatpost comprising:
   a seatpost assembly configured to slide into a bicycle seat tube, until a cap boss slides into a cap boss receptacle;
   a seatpost actuator assembly configured for installation into a bicycle frame and for fitting inside the bicycle seat tube such that a disconnect cable stop fits into the bicycle seat tube, and a disconnect cable stop flange is radially constrained by the seat tube inner surface; and
   a securing device configured to hold the seatpost actuator assembly in place by sliding through a seatpost locating frame hole and a frame mounting hole.

9. The telescopic bicycle seatpost of claim 8 further comprising an actuation cable assembly fitted to an actuator cable stop hole, and a cable end for attaching to a cartridge actuation cam, such that actuating the actuator cable would rotate the cartridge actuation cam about a cam pivot pin.

10. The telescopic bicycle seatpost of claim 8 further comprising a tube flange seat surface pressed against a seat tube top surface, such that a location of the seatpost in a direction of a seatpost center axis is controlled by a co-location of the tube flange seat and the seat tube top surface.

11. The telescopic bicycle seatpost of claim 8 further comprising a clamp collar screw configured to be tightened in a clamp collar, such that a friction force between a seat tube inner surface and a tube outside diameter.

12. The telescopic bicycle seatpost of claim 8 further comprising a gas spring cartridge configured for raising and lowering a seat.

13. A method comprising:
    installing a seatpost actuator assembly into a bicycle frame;
    fitting an actuation cable assembly to an actuator cable stop hole and attaching a cable end to a cartridge actuation cam of the seatpost actuator assembly;
    sliding an adjustable seatpost assembly into a bicycle seat tube; and
    securing a clamp collar such that a friction force between an inner surface of the bicycle seat tube and an outside diameter of the bicycle seat tube prevents a seatpost from rotating and holds the seatpost in place in a bicycle.

14. The method of claim 13 further comprising adjusting the adjustable seatpost assembly using height adjustment grooves and a stop clip of the adjustable seatpost.

15. The method of claim 13 further comprising adjusting a height of a seat using a gas spring cartridge in the adjustable seatpost assembly.

16. The method of claim 13 wherein the seatpost actuator assembly is configured to remain installed in the bicycle when the adjustable seatpost assembly is removed.

17. The method of claim 13 wherein a cap boss of the adjustable seatpost assembly is configured to fit into a cap boss receptacle of the seatpost actuator assembly.

18. A method comprising:
    removing a seatpost from a bicycle;
    adjusting a maximum extension length of an adjustable seatpost assembly; and
    replacing the seatpost in the bicycle, wherein adjusting the maximum extension length of the adjustable seatpost assembly comprises moving a stop clip up or down on the adjustable seatpost assembly.

19. The method of claim 18 further comprising loosening a clamp to release the seatpost.

20. The method of claim 18 further comprising adjusting a height of a seat using a gas spring cartridge in the adjustable seatpost assembly.

21. The method of claim 18 wherein the seatpost actuator assembly is configured to remain installed in a bicycle when the adjustable seatpost assembly is removed.

22. A method comprising:
    removing a seatpost from a bicycle;
    adjusting a maximum extension length of an adjustable seatpost assembly; and
    replacing the seatpost in the bicycle, wherein a cap boss of the adjustable seatpost assembly is configured to fit into a cap boss receptacle of the seatpost actuator assembly.

\* \* \* \* \*